United States Patent
Walls et al.

(10) Patent No.: US 7,233,573 B2
(45) Date of Patent: Jun. 19, 2007

(54) APPARATUS AND METHOD FOR RECEIVING DATA FROM A NETWORK

(75) Inventors: Jeffrey Joel Walls, Fort Collins, CO (US); Michael T. Hamilton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1036 days.

(21) Appl. No.: 10/361,878

(22) Filed: Feb. 8, 2003

(65) Prior Publication Data

US 2004/0156366 A1   Aug. 12, 2004

(51) Int. Cl.
  *H04L 1/00*   (2006.01)
  *G08C 25/02*  (2006.01)
(52) U.S. Cl. .................. 370/236; 370/235; 370/466; 714/748
(58) Field of Classification Search .............. None
See application file for complete search history.

(56) References Cited

U.S. PATENT DOCUMENTS

| | | | |
|---|---|---|---|
| 4,475,192 A | 10/1984 | Fernow et al. | |
| 4,933,932 A | 6/1990 | Quinquis et al. | |
| 5,016,248 A | 5/1991 | Kudoh | |
| 5,291,482 A | 3/1994 | McHarg et al. | |
| 5,303,302 A | 4/1994 | Burrows | |
| 5,610,914 A | 3/1997 | Yamada | |
| 5,701,427 A | 12/1997 | Lathrop | |
| 5,802,058 A | 9/1998 | Harris et al. | |
| 6,128,295 A | 10/2000 | Larsson et al. | |
| 6,212,165 B1 | 4/2001 | Mann et al. | |
| 6,266,701 B1 | 7/2001 | Sridhar et al. | |
| 6,400,695 B1 | 6/2002 | Chuah et al. | |
| 6,445,717 B1 | 9/2002 | Gibson et al. | |
| 6,539,431 B1 | 3/2003 | Sitaraman et al. | |
| 2003/0159099 A1* | 8/2003 | Vukovic et al. | 714/749 |

OTHER PUBLICATIONS

Adamson, et al.,NACK-Oriented Reliable Multicast (NORM) Protocol Building Blocks, Proceedings of the Fourty-Ninth Internet Engineering Task Force (Jul. 2000) < http://www.ietf.org/proceedings/00dec/I-D/draft-ietf-rmt-morm-bb-00.txt.

Adamson, et al.,NACK-Oriented Reliable Multicast Protocol (NORM), Proceedings of the Fourty-Ninth Internet Engineering Task Force (Nov. 2000) < http://www.ietf.org/proceedings/00dec/I-D/draft-ietf-rmt-morm-00.txt.

* cited by examiner

*Primary Examiner*—Chi Pham
*Assistant Examiner*—Ronald Abelson

(57) ABSTRACT

An apparatus for receiving data from a network comprises a network interface and logic. The network interface is configured to receive a sequence of data packets from a network. The logic is configured to detect when a data packet is missing from the sequence. The logic is configured to initiate at least one retransmission of the missing data packet via a first transport protocol. The logic is further configured to initiate another retransmission of the missing data packet via a second transport protocol in response to a determination that an attempt to access the missing data packet is imminent.

28 Claims, 10 Drawing Sheets

APPARATUS AND METHOD FOR RECEIVING DATA FROM A NETWORK

RELATED ART

In current internet protocol (IP) communication systems, data packets are typically transmitted from a transmitting unit through a network to at least one destination receiving unit. In ideal systems, data packets transmitted by a transmitting unit and destined for a particular receiving unit arrive at the receiving unit in the same order that such packets were transmitted by the transmitting unit. However, in typical systems, some of the data packets are lost (i.e., never arrive at their intended destination), and some of the data packets arrive at their intended destination out of order (i.e., in an order different than that transmitted by the transmitting unit). Thus, techniques have been developed for attempting to compensate for lost and out of order data packets.

Specifically, when transmitting a sequence of data packets through a network to a receiving unit, a transmitting unit inserts, into each packet, a sequence indicator that is indicative of the packet's position within the sequence. The receiving unit monitors the sequence indicators of the received data packets to determine whether any packets of the sequence are missing and may, therefore, be lost. Once the receiving unit determines that a data packet is indeed lost, the receiving unit communicates a retransmission request back through the network to the transmitting unit, which retransmits the lost data packet in response to the retransmission request. However, the methodology employed to determine when to submit a retransmission request may significantly impact the performance of the communication system.

In this regard, when a receiving unit detects that a data packet is missing from a sequence of received data packets, the receiving unit does not usually know whether the missing data packet is actually lost (i.e., will never arrive at the receiving unit) or whether the missing data packet is simply out of order and will, therefore, arrive at a later time. Thus, before submitting a retransmission request to the transmitting unit, the receiving unit normally waits for a specified time period, referred to hereafter as the "retransmission wait period." If the missing data packet arrives before expiration of the retransmission wait period, then no retransmission request is communicated to the transmitting unit. However, if the missing data packet has not arrived once the retransmission wait period expires, then the receiving unit submits a retransmission request to the transmitting unit.

If the retransmission wait period is set too short, then it is likely that a retransmission request will be submitted in many instances when the missing data packet is not actually lost but is rather still enroute to the receiving unit. Such needless submissions of retransmission requests decrease the transmission efficiency of the communication system.

Conversely, if the retransmission wait period is set too long, then the submission of the retransmission request may not occur soon enough to prevent various types of inefficiencies from occurring at the receiving unit. For example, by waiting too long to submit a retransmission request for a lost data packet, it is possible that one or more components at the receiving unit may be stalled until a retransmission of the lost data packet arrives at the receiving unit.

SUMMARY OF THE INVENTION

Thus, is it generally desirable to strategically set the retransmission wait period such that the efficiency of the communication system is enhanced. Generally, embodiments of the present invention pertain to an apparatus and method for receiving data from a network.

An exemplary apparatus in accordance with one embodiment of the present invention comprises a network interface, a queue, and logic. The network interface is configured to receive a sequence of data packets from a network. The logic is configured to store, in the queue, entries pointing to the data packets. The logic is configured to detect when a data packet is missing from the sequence, the missing data packet having a queue position within the queue. The logic is configured to select a transport protocol based on the queue position of the missing data packet and to initiate a retransmission of the missing data packet via the selected transport protocol.

An exemplary apparatus in accordance with another embodiment of the present invention comprises a network interface and logic. The network interface is configured to receive a sequence of data packets from a network. The logic is configured to detect when a data packet is missing from the sequence. The logic is configured to initiate at least one retransmission of the missing data packet via a first transport protocol. The logic is further configured to initiate another retransmission of the missing data packet via a second transport protocol in response to a determination that an attempt to access the missing data packet is imminent.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
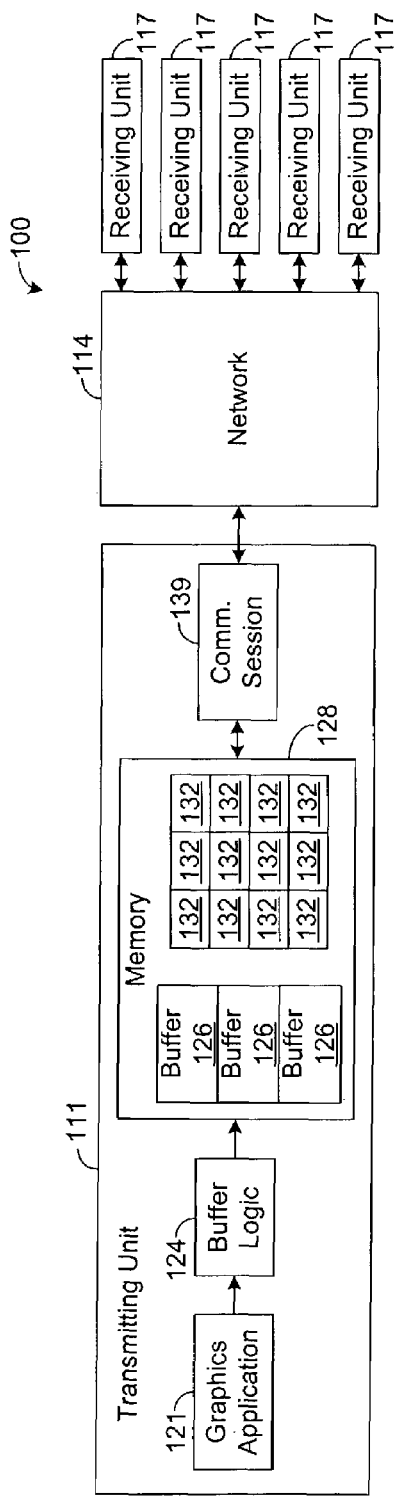
FIG. 1 is a block diagram illustrating an exemplary embodiment of a communication system in accordance with the present invention.

As set forth hereinbove, it is generally desirable to set the retransmission wait period of a receiving unit of a communication system such that the efficiency of the communication system is enhanced. Unfortunately, the optimum length of the retransmission wait period typically varies for different communication systems depending on various dynamic variables, such as for example, the amount of data included in each data packet, the amount of traffic occurring over the network, the error rate associated with the network, etc. Such variables make it difficult to determine the optimum length of time that a receiving unit within a particular communication system is to wait before it requests a retransmission of a missing data packet.

Furthermore, the extent to which it is desirable for a receiving unit to monitor for missing data packets and to request retransmissions of missing data packets depends on the type of transport protocol used to communicate the data packets to the receiving device. In this regard, some transport protocols are designed to provide more reliable data transmission thereby obviating the need or desire for a receiving unit to separately monitor the received data packets for lost data packets. As an example, transmission control protocol (TCP) is a highly reliable transport protocol in which each data packet transmitted through a network is guaranteed, by TCP, to be received at its destination. Thus, the need or desire for a receiving unit to separately monitor the received data packets for lost packets is obviated. However, user datagram protocol (UDP), on the other hand, is an unreliable transport protocol in that delivery of each data packet to its intended destination is not guaranteed by UDP. Thus, when communicating via UDP, it is typically desirable for a receiving unit to comprise additional logic for detecting lost data packets and requesting retransmission of the lost data packets.

A variant of UDP, referred to as UDP-Multicast (UDPM), is a highly efficient transport protocol for communicating data to many destinations. In this regard, a transmitting unit initially specifies a set of destination receiving units that are to receive data from the transmitting unit. Then, for each packet to be transmitted by the transmitting unit, a UDPM network layer interfaces the packet with a network such that the packet is communicated to each of the specified destination receiving units. Thus, in accordance with UDPM, the transmitting unit may interface the packet with the network layer only once, yet the packet is quickly received by a large number of destination receiving units. Such a transport protocol is substantially different than other transport protocols, such as TCP, in which each data packet interfaced with a network layer is received by only one destination receiving unit.

The fast nature by which UDPM communicates data packets makes UDPM attractive for systems, such as graphics systems, where speed and efficiency are primary concerns. However, reliability is another primary concern for most graphics systems since even a small number of missing packets of graphical data can significantly distort an image produced by a graphics system. Moreover, the unreliable nature of UDP, as described above, is a significant drawback to using UDPM for communicating graphical data through a network. Accordingly, system designers often utilize other types of transport protocols, such as TCP, for example, for communicating graphical data through a network even though UDPM would be a more suitable protocol except for its unreliable nature.

FIG. 1 depicts a communication system 100 in accordance with an exemplary embodiment of the present invention. As shown by FIG. 1, the system 100 comprises a transmitting apparatus or unit 111 that is configured to transmit data packets through a network 114 to at least one receiving apparatus or unit 117 via a packet transfer protocol, such as internet protocol (IP), for example. Although other types of data may be communicated by the system 100, the system 100 will be described hereafter, for illustrative purposes, as communicating graphical data from the transmitting unit 111 to the receiving units 117 such that components of the receiving units 117 may render such graphical data.

As shown by FIG. 1, the transmitting unit 111 preferably comprises a graphics application 121 that produces graphical data according to known or future-developed techniques. Buffer logic 124 within the transmitting unit 111 stores the graphical data into blocks 126 of memory 128, referred to as "buffers." A process, referred to hereafter as the "communication session 139," retrieves the graphical data from the buffer 126 and packetizes the retrieved data, thereby forming a plurality of data packets for transmission across the network 114 to at least one receiving unit 117. Exemplary techniques for storing to and retrieving from the buffers 126 are described in co-pending and commonly-assigned U.S. patent application entitled "Data Buffering Apparatus and Method," and filed on Feb. 8, 2003, which is incorporated herein by reference.

In a preferred embodiment, the communication session 139 enables the data packets to be selectively transmitted via one of a plurality of transport protocols. As an example, in an embodiment that will be described in more detail hereafter, the communication session 139 enables each packet to be selectively transmitted via user datagram protocol-multicast (UDPM) or transmission control protocol (TCP). However, it should be emphasized that the communication session 139 may enable the data packets to be transmitted via other types of transport protocols in other embodiments.

Figure 2:
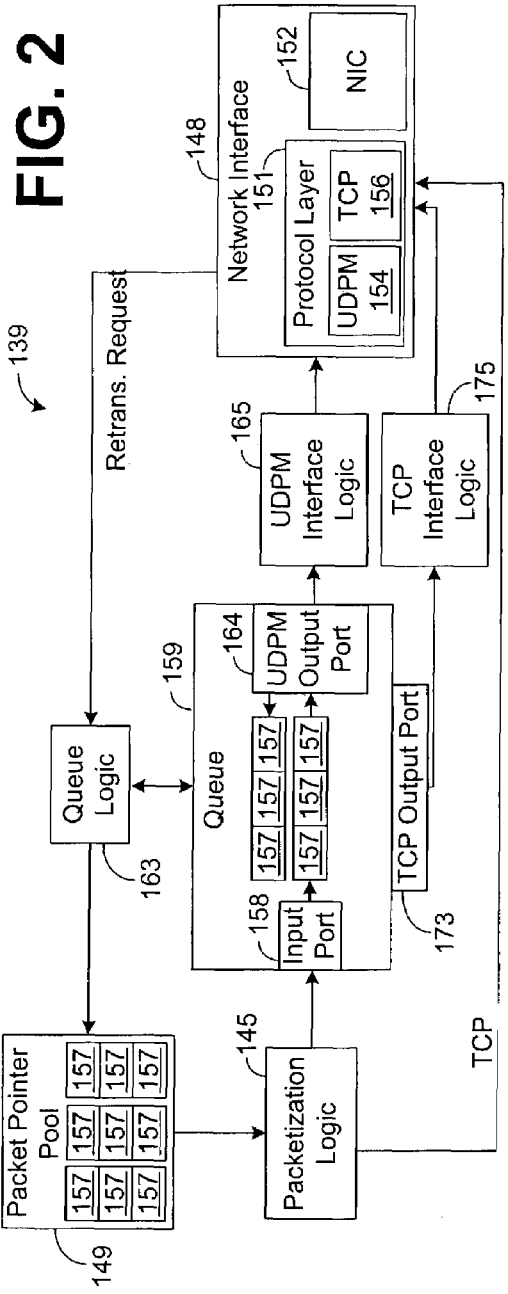
FIG. 2 is a block diagram illustrating an exemplary communication session, such as is depicted in FIG. 1.

In the embodiment shown by FIG. 2, the communication session 139 comprises packetization logic 145 that is configured to retrieve graphical data from the buffers 126 of FIG. 1. Packetization logic 145 within the session 139 shown by FIG. 2 then packetizes the retrieved data into a plurality of data packets for transmission to the network 114 (FIG. 1). Depending on the type of transport protocol employed for the transmission of the data packets to the receiving units 117, it may be desirable to retransmit various ones of the data packets (e.g., data packets that are lost during transmission through the network 114) in response to retransmission requests from the receiving units 117.

As an example, UDPM is a type of transport protocol that does not guarantee the successful arrival of a transmitted packet at its destination. For such protocols, the packetization logic 145 is preferably configured to temporarily store, into a block 132 of memory 128 (FIG. 1), a copy of each data packet packetized by the packetization logic 145. As will be described in more detail hereafter, the packets stored in the memory blocks 132 may be used to retransmit data packets in response to retransmission requests generated by the receiving units 117. If a data packet is to be communicated from the transmitting unit 111 via another transport protocol, such as TCP, for example, that guarantees successful arrival of the packet at its destination, then the packetization logic 145 may be configured to transmit the packet to the network interface 148 without writing the packet to a memory block 132.

As shown by FIG. 2, the network interface 148 comprises a network protocol layer 151 and a network interface card (NIC) 152. The network protocol layer 151 is preferably configured to interface data packets with the network 114 via various transport protocols and to enable the packetization logic 145 or other component of the session 139 to select which type of transport protocol is to be used to communicate a particular packet through the network 114. The NIC 152 preferably comprises various hardware components (not shown) for interfacing data with the network 114. For each packet to be interfaced with the network 114, the network protocol layer 151 drives the packet through the NIC 152 to the network 114.

In the exemplary embodiments described herein, the network protocol layer comprises a UDPM socket 154 and a TCP socket 156. The UDPM socket 154 is configured to communicate data packets through the NIC 152 and to the network 114 using UDPM. Moreover, by writing a data packet to the UDPM socket 154, the data packet is ultimately communicated through the network 114 to each of a specified set of receiving units 117. However, the UDPM socket 154 and NIC 152 do not ensure that the data packet is successfully received by each of the specified receiving units 117.

The TCP socket 156, on the other hand, is configured to communicate data packets through the NIC 152 and to the network 114 using TCP. Thus, each data packet written to the TCP socket 156 is communicated to a specified receiving unit 117, and the TCP socket 156 and NIC 152 ensure that the data packet successfully arrives at and is received by the specified receiving unit 117.

It should be noted that there are various techniques that may be employed by the transmitting unit 111 to interface data packets with the network interface 148. In an exemplary embodiment shown by FIGS. 1 and 2, the memory blocks 132 are pre-allocated, and the communication session 139 comprises a packet pointer pool 149 storing a plurality of packet pointer entries 157 that point to the memory blocks 132. In this regard, each pointer entry 157 in the packet pointer pool 149 preferably points to an available one of the memory blocks 132 (i.e., one of the memory blocks 132 that may be written to without corrupting data within the memory block 132). Initially, all of the memory blocks 132 are available, and the packet pointer pool 149 comprises a pointer entry 157 for each of the memory blocks 132. However, when a memory block 132 is written to, as will be described in more detail hereinbelow, the pointer entry 157 associated with (i.e., pointing to) this memory block 132 is pulled from the pool 149 and is not returned until the associated memory block 132 is again available. Thus, the entries 157 of the packet pointer pool 149 may be analyzed to determine to which of the memory blocks 132 may be written.

Note that it is not necessary for the blocks 157 to be pre-allocated. In this regard, it is possible for the packetization logic 145 to dynamically allocate a memory block 132 and an associated pointer entry 157 for each packet generated by the packetization logic 145. However, the allocation of memory blocks 132 and packet pointer entries 157 consumes time and processing resources, potentially slowing the rate at which the packetization logic 145 can process data packets. Thus, pre-allocating memory blocks 132 and pointer entries 157 helps to improve the performance of the packetization logic 145 by eliminating the step of dynamically allocating memory for the data packetized by the packetization logic 145.

For each TCP packet packetized by the packetization logic 145, the logic 145 writes the TCP packet to the TCP socket 156. The TCP socket 156 then communicates the packet to its intended destination over network 114 via known or future-developed TCP techniques.

Figure 3:
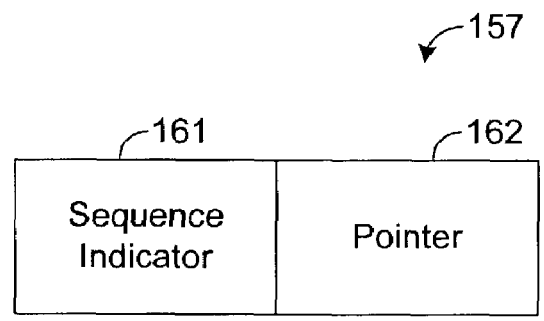
FIG. 3 is a block diagram illustrating an exemplary pointer entry, such as is depicted in FIG. 2.

For each UDPM packet packetized by the packetization logic 145, the logic 145 pulls one of the pointer entries 157 from the packet pointer pool 149 and stores the data defining the packet to the memory block 132 pointed to by the pulled entry 157. The packetization logic 145 also stores the sequence indicator 161 of the foregoing packet into the pulled entry 157 and writes the pulled pointer entry 157 to an input port 158 of an ordered queue 159. As shown by FIG. 3, each pointer entry 157 preferably comprises a sequence indicator 161 that uniquely identifies the corresponding packet (i.e., the packet pointed to by the entry 157) and a pointer 162 that points to the memory block 132 where the corresponding packet is stored.

Queue logic 163 generally controls when data packets may be input and output from the queue 159. Except when servicing a retransmission request, as will be described in more detail hereinbelow, the queue logic 163 outputs the pointer entries 157, via a UDPM output port 164, in the same order that such entries are input to the queue 159 via the input port 158. For each pointer entry 157 output via the UDPM output port 164, UDPM interface logic 165 reads the pointer entry 157 and retrieves the packet stored at the memory block 132 identified by the pointer 162 of the pointer entry 157. The interface logic 165 then writes the retrieved data packet to the UDPM socket 154 of the network protocol layer 151. As described above, this socket 154 drives the data packet through the NIC 152 to the network 114, which transmits the data packet to a specified set of receiving units 117 according to UDPM communication techniques.

When a pointer entry 157 is output via the UDPM output port 164 and read by the interface logic 165, the queue logic 163 preferably retains the pointer entry 157 in the queue 159 until it can be ensured that a retransmission request for the entry's corresponding packet will not be received from one of the receiving units 117. Once it can be ensured that such a retransmission will not be received, the queue logic 163 classifies the entry 157 as "expired." Further, the queue logic 163 is configured to return each expired entry 157 to the packet pointer pool 149. Returning an expired entry 157 to the packet pointer pool 149 has the effect of freeing the memory block 132 pointed to by the expired entry 157. In this regard, once an entry 157 is returned to the pointer pool 149, the entry 157 may be pulled by the packetization logic 145, and the corresponding memory block 132 may be used by the packetization logic 145 to store a data packet that is packetized by the logic 145.

During operation, the receiving units 117 may generate retransmission requests for missing or lost UDPM data packets (e.g., packets that do not arrive at their destination receiving units 117). Each such retransmission requests identifies the missing or lost data packet or packets (e.g., includes data indicating the sequence indicators 161 of the lost or missing packets) and are transmitted back to the transmitting unit 111, which retransmits the identified missing or lost data packets in response to the retransmission requests. In addition, each receiving unit 117 may also periodically generate an acknowledgment that it has successfully received a particular packet. For example, a receiving unit 117 may generate an acknowledgement for each $50^{th}$ data packet successfully received by receiving unit 117 although other numbers of successfully received data packets may trigger an acknowledgment in other embodiments. The acknowledgments, like the retransmission requests, identify the data packet at issue (e.g., include the sequence indicator 161 of the received data packet) and are received by the transmitting unit 111.

Each acknowledgement and retransmission request received by the transmitting unit 111 is preferably provided to the queue logic 163. For each retransmission request, the queue logic 163 outputs, from the queue 159, the entry or entries 157 corresponding to the packet or packets identified by the retransmission request. If the retransmission is to occur via UDPM, the queue logic 163 outputs the foregoing entry 157 via UDPM output port 164. As a result, the UDPM interface logic 165 reads the foregoing entry 157 and, in response, retrieves the packet pointed to by the entry's pointer 162 (FIG. 3). The interface logic 165 then writes the retrieved packet to the UDPM socket 154, which communicates the retrieved packet across the network 114 via UDPM.

However, if the aforementioned retransmission of a missing or lost UDPM data packet is to occur using TCP, then the queue logic 163 outputs the foregoing entry 157 via a TCP output port 173 to TCP interface logic 175. The TCP interface logic 175 is configured to retrieve the packet pointed to by each entry 157 output from the TCP output port 173 and to write the retrieved packet to the TCP socket 156, which communicates each such packet over network 114 via TCP. Thus, the packet pointed to by the aforementioned entry 157 output from the TCP port 173 in response to the retransmission request is transmitted over network 114 via TCP rather than UDPM.

Furthermore, for each retransmission request and acknowledgment received by the queue logic 163, the queue logic 163 assumes that each of the data packets transmitted from the transmitting unit 111 prior to the packet or packets identified by the received acknowledgment or retransmission request has been successfully received by its destination receiving unit or units 117. Thus, the queue logic 163 classifies the entries 157 corresponding to the earlier transmitted packets (i.e., the packets transmitted prior to the packet or packets identified by the acknowledgment or retransmission request) as expired, and the logic 163 returns these expired entries 157 to the packet pointer pool 149. Thus, the packetization logic 145 may use the memory blocks 132 pointed to by these expired entries 157 to store future data packets packetized by the logic 145.

The queue logic 163 may also be used to control the transmission rate of the session 139 such that a more optimum rate is achieved. In this regard, it is generally desirable to have the session 139 communicate at higher rates in an effort to increase throughput. However, it is possible for the transmission rate to be set at a level substantially higher than the rate at which the receiving units 117 can successfully receive packets. In such a situation, a large number of retransmission requests may be generated thereby increasing the amount of traffic communicated between the transmitting unit 111 and the receiving units 117. Thus, decreasing the transmission rate of the session 139 may actually increase throughput by reducing the number of retransmission requests generated by the receiving units 117.

In an exemplary embodiment, the queue logic 163 is configured to enable the packetization logic 145 to periodically insert only a limited number of entries 157 into the queue 159 in order to control the transmission rate of the session 139. As an example, the queue logic 163 may be configured to enable the packetization logic 145, every three-hundred (300) micro-seconds (or some other time period), to buffer, for transmission over network 114, up to one-hundred (100) pending entries 157 (or some other maximum number of pending entries 157) in the queue 159 at a time. As used herein, a "pending entry" refers to an entry 157 that has been inserted into the queue 159 but has yet to output from the queue 159. Note that the maximum number of pending entries 157 that may be buffered by the queue 159 preferably does not include any entries 157 that have been previously output from the queue 159 and are being retained in the queue 159 for the purposes of servicing retransmission requests. Thus, regardless of the number of entries 157 that the packetization logic 145 is ready to insert in the queue 159, the logic 145 is enabled, by the queue logic 163, to insert a limited number of entries 157 within the queue 159 during a particular time period.

Moreover, by controlling the maximum number of entries 157 that may be periodically inserted by the packetization logic 145, the queue logic 163 can control the transmission rate of the session 139. In this regard, to determine whether to change the transmission rate of the session 139, the queue logic 163 can count the number of retransmission requests that are received during a particular time period and compare this count to an upper threshold ("$TH_H$"). Note that $TH_H$ is preferably established such that it is generally desirable to reduce the transmission rate of the session 139 when $TH_H$ is exceeded in order to reduce the number of retransmission requests that are occurring. Thus, if the count exceeds $TH_H$, the queue logic 163 may be configured to decrease the maximum number of pending entries 157 that may be buffered by the queue 159. The foregoing has the effect of enabling less data packets to be transmitted during a particular time period thereby decreasing the transmission rate of the session 139.

Conversely, to determine whether to increase the transmission rate of the session 139, the queue logic 163 can compare the number of retransmission requests that are received during a particular time period to a lower threshold ("$TH_L$"). Note that $TH_L$ is preferably established such that it is generally desirable to increase the transmission rate of the session 139 when the count falls below $TH_L$. Such a situation arises when the number of retransmission requests is low enough to indicate that the transmission rate of the session 139 can be increased without generating an unacceptable number of retransmission requests. Thus, if the count falls below $TH_L$, the queue logic 163 may be configured to increase the maximum number of pending entries 157 that may be buffered by the queue 159. The foregoing has the effect of enabling more data packets to be transmitted during a particular time period thereby increasing the transmission rate of the session 139. Note that levels of $TH_H$ and $TH_L$ are design choices based upon retransmission rate tolerances.

It should be noted that the graphics application 121, network interface 148, and each set of logic 124, 145, 163, 165, and 175 depicted by FIGS. 1 and 2 may be implemented in hardware, software, or any combination thereof.

Figure 4:
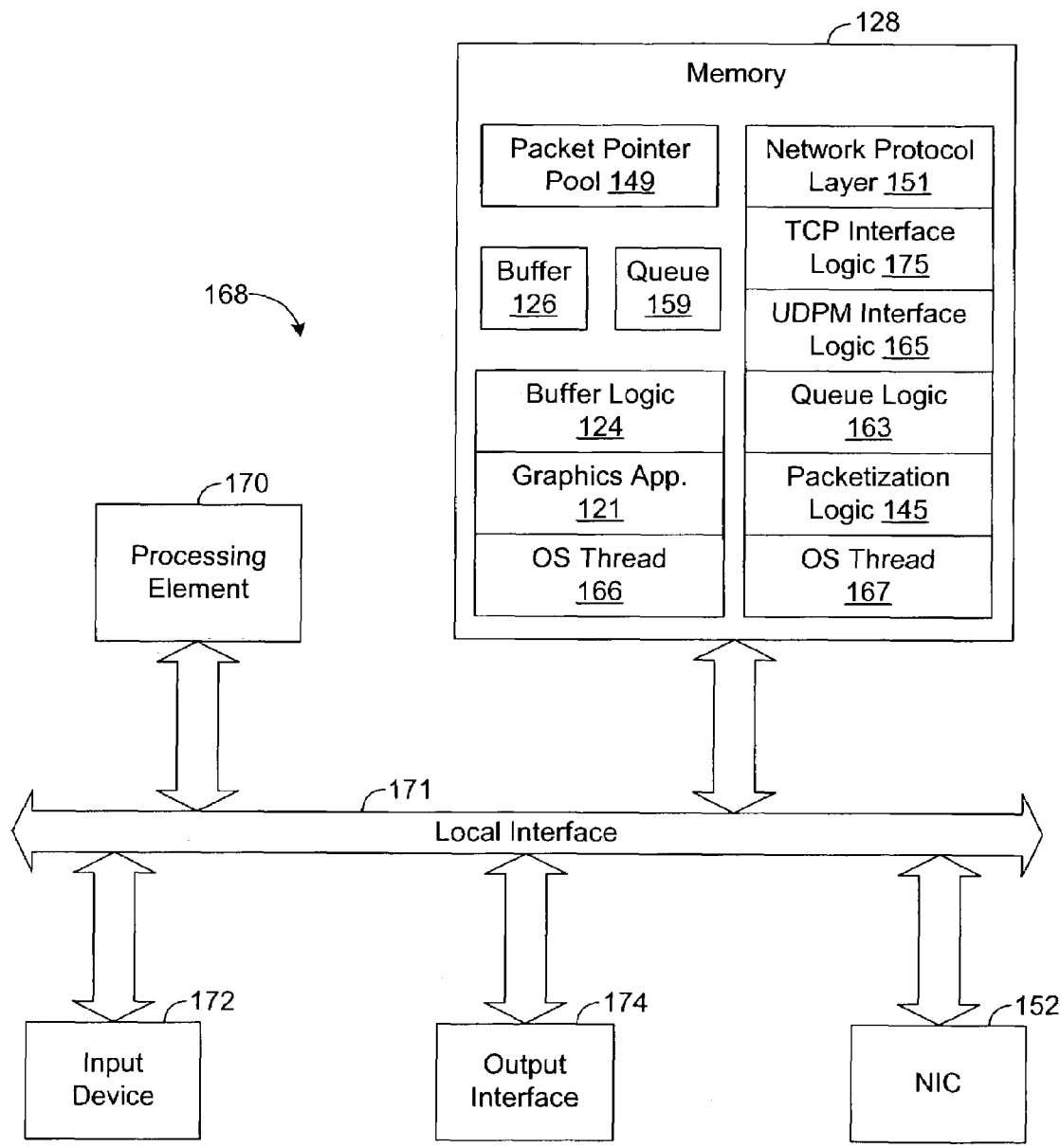
FIG. 4 is a block diagram illustrating an exemplary computer system that may be employed to implement a transmitting unit, such as is depicted in FIG. 1.

In an exemplary embodiment illustrated by way of example in FIG. 4, the graphics application 121 and buffer logic 124 are implemented in software and run on an operating system (OS) thread 166 of a computer system 168. Furthermore, the network protocol layer 151 and each set of logic 145, 163, 165, and 175 are implemented in software and run on an OS thread 167 that is separate from the OS thread 166.

Note that any portion of the graphics application 121, network protocol layer 151, and the logic 124, 145, 163, 165, and 175 when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

As shown by FIG. 4, the computer system 168 comprises memory 128 that stores the software components of the transmitting unit 111. The system 168 further comprises at least one conventional processing element 170, such as a digital signal processor (DSP) or a central processing unit (CPU), that communicates to and drives the other elements within the system 168 via a local interface 171, which can comprise one or more buses. Furthermore, an input device 172, for example, a keyboard or a mouse, can be used to input data from a user of the system 163, and an output device 174, for example, a screen display or a printer, can be used to output data to the user.

Note that having the graphics application 121 and the software components of the communication session 139 run on separate OS threads 166 and 167 can help to improve the performance of the graphics application 121. In such an embodiment, the OS thread 166 running the graphics application 121 is not burdened with the tasks of interfacing, with the network 114, the graphical data produced by the application 121 once such data has been written to the buffers 126 (FIG. 1). Thus, the tasks of interfacing the graphical data with the network 114 do not usurp substantial processing resources from the graphics application 121, enabling the graphics application 121 to be processed at a relatively fast rate even when the session 139 is burdened with interfacing a large amount of data with the network 114.

Figure 5:
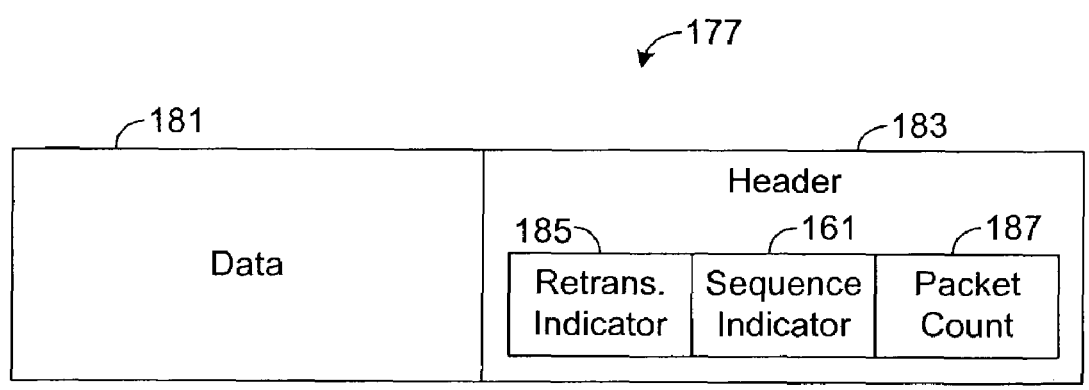
FIG. 5 is a block diagram illustrating an exemplary data packet that may be communicated by a communication system, such as is depicted in FIG. 1.

As shown by FIG. 5, each data packet 177 transmitted by the transmitting unit 111 of FIG. 1 comprises a data portion 181 and a header 183. The header 183 may comprise various control information that can be used to control the transmission of the data packet 177 through the network 114 (FIG. 1) to its intended destination. The header 183 also preferably comprises a retransmission indicator 185 indicating whether or not the data packet 177 is a retransmission of a packet previously transmitted to the network 114 by the transmitting unit 111. In addition, the header 183 preferably comprises the packet's sequence indicator 161, which is indicative of the data packet's position within a sequence of packets transmitted by the transmitting unit 111. The header 183 also preferably comprises a value, referred to as a "packet count 187." Utilization of the retransmission indicator 183, the sequence indicator 185, and the packet count 187 will be described in more detail hereinbelow.

Figure 6:
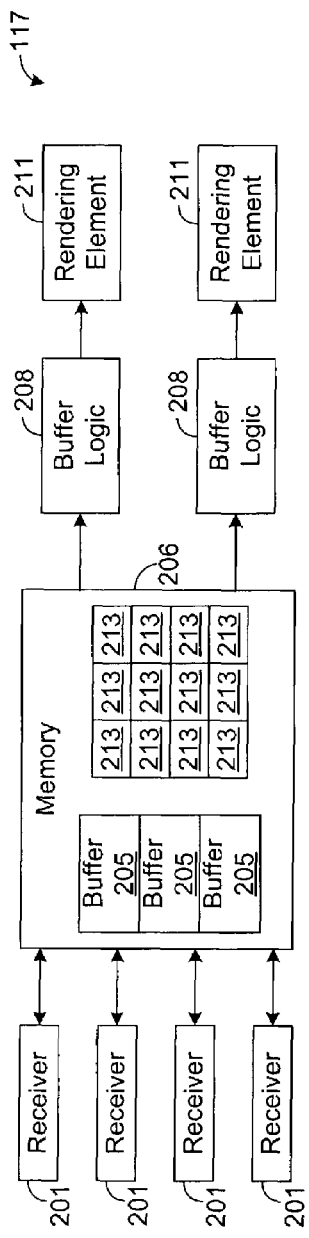
FIG. 6 is a block diagram illustrating an exemplary receiving unit, such as is depicted in FIG. 1.

Each packet transmitted by the transmitting unit 111 to the network 114 is preferably routed, by the network 114, to the receiving unit 117 associated with an address included in the header 183 of the packet. As shown by FIG. 6, each receiving unit 117 comprises at least one receiver 201 for receiving data packets from the network 114. Each receiver 201 preferably writes the data portion 181 of each received packet into a block 205 of memory 206, referred to as a "buffer 205." In this regard, each packet having data from the same buffer 126 of FIG. 1, is preferably stored to the same buffer 205 of FIG. 6.

To achieve the foregoing, the packetization logic 145 of FIG. 2 may be configured to determine the total number of packets used to transmit the data retrieved from a particular buffer 126 (FIG. 1), and the logic 145 may be configured to store this value in the header 183 (FIG. 5) of each such packet as the packet count 187. Further, the transmitting unit 111 is preferably configured to consecutively transmit each such packet to the receiving unit 117. Thus, by analyzing the packet counts 187 of the packets, the receiver 201 can identify each packet that comprises data from the particular buffer 126. In this regard, upon receiving the first packet comprising data from the particular buffer, the receiver 201 can determine that the next y number of consecutively received data packets also comprise data from the particular buffer 126, where "y" corresponds to a value one less than the value of the packet count 187. Thus, the receiver 201 may store the data of each such packet into the same buffer 205.

Buffer logic 208 preferably retrieves the data stored in the buffers 205 and provides this data to other devices at the receiving unit 117. In the instant example where graphical data is packetized at the transmitting unit 111 of FIG. 1 and transmitted to the receiving unit 117 shown by FIG. 6, each set of buffer logic 208 corresponds to and communicates with a rendering element 211, as shown by FIG. 6. Further, each set of buffer logic 208 retrieves, from the buffers 205, graphical data that is to be rendered by its corresponding rendering element 211, and the corresponding rendering element 211 then renders such data according to known or future-developed techniques.

Figure 7:
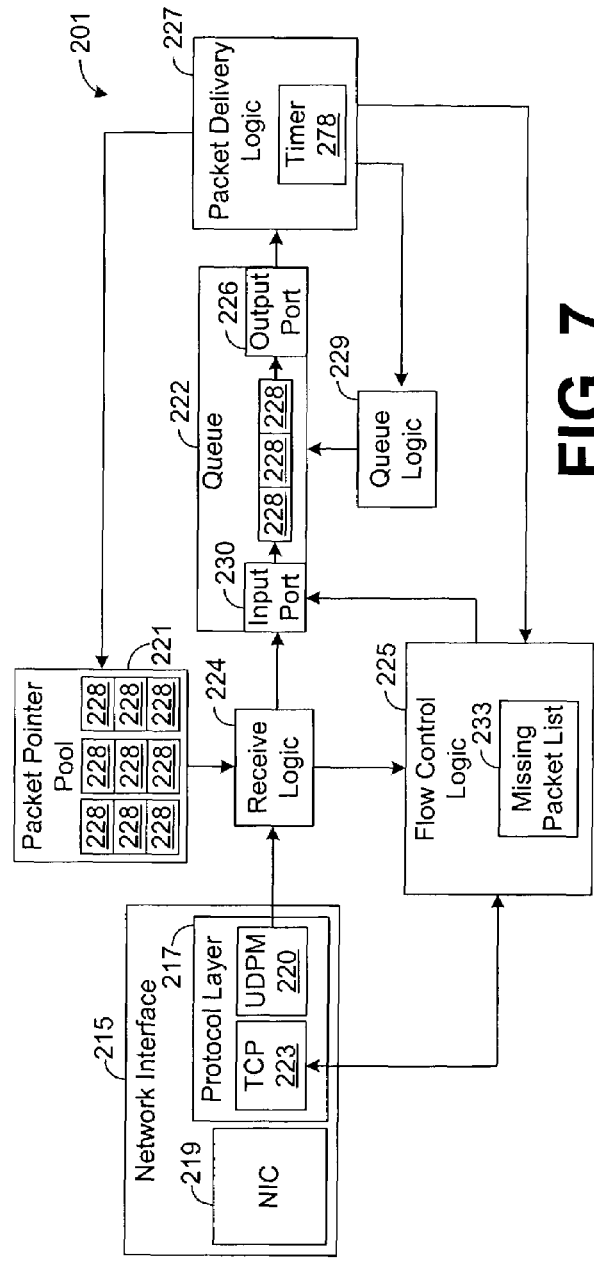
FIG. 7 is a block diagram illustrating an exemplary receiver, such as is depicted in FIG. 6.

As shown by FIG. 7, each receiver 201 preferably comprises a network interface 215 that receives data packets from the network 114 of FIG. 1. The network interface 215 of FIG. 7 comprises a network protocol layer 217 and a network interface card (NIC) 219, which may comprise various hardware components (not shown) for communicating data with the network 114. The network protocol layer 217 preferably enables communication with the network 114 via various transport protocols, as will be described in more detail hereafter.

Figure 8:
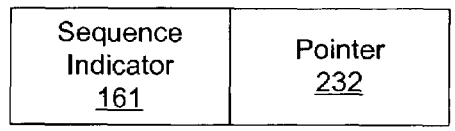
FIG. 8 is a block diagram illustrating an exemplary pointer entry, such as is depicted in FIG. 7.

In an exemplary embodiment shown by FIGS. 6 and 7, the memory blocks 213 are pre-allocated, and each receiver 201 comprises a packet pointer pool 221 that stores a plurality of packet pointer entries 228 that point to the memory blocks 213 of FIG. 6. In this regard, as shown by FIG. 8, each pointer entry 228 in the packet pointer pool 221 preferably has a pointer 232 that points to an available one of the memory blocks 213 (i.e., one of the memory blocks 213 that may be written to without corrupting data in the memory block 213). Initially, all of the memory blocks 213 are available, and the packet pointer pool 221 comprises a pointer entry 228 for each of the memory blocks 213. However, when a memory block 213 is written to, as will be described in more detail hereinbelow, the pointer entry 228 associated with (i.e., pointing to) this memory block 213 is pulled from the pool 221 and is not returned until the associated memory block 213 is again available. Thus, the entries 228 of the packet pointer pool 221 may be analyzed to determine which of the memory blocks 213 may be written to.

Note that it is not necessary for the blocks 213 to be pre-allocated. In this regard, it is possible for the receive logic 224 to dynamically allocate a memory block 213 and an associated pointer entry 228 for each packet received by the receive logic 224. However, the allocation of memory blocks 213 and packet pointer entries 228 consumes time and processing resources potentially slowing the rate at which the receive logic 224 can process data packets. Furthermore, slowing the packet processing rate of the receive logic 224 can increase the number of lost data packets thereby resulting in a higher number of retransmission requests that can significantly degrade the performance of the communication system 100. Thus, pre-allocating memory blocks 213 within the pool 221 helps to improve the performance of the receive logic 224 and of the system 100 as a whole.

When the receive logic 224 receives a packet from the network interface 215, the logic 224 pulls an entry 228 from the packet pointer pool 221 and stores the data packet to the memory block 213 pointed to by the pointer 232 of the pulled entry 228. In addition, the receive logic 224 stores the sequence indicator 161 of the received packet into the pulled entry 228 and writes the pulled entry 228 to an input port 230 of an ordered queue 222. The receive logic 224 also transmits the sequence indicator 161 and the retransmission indicator 185 of the received packet to flow control logic 225, which will be described in more detail hereinbelow.

As shown by FIG. 7, the queue 222 comprises an output port 226 from which packet delivery logic 227 reads or pulls pointer entries 228 from the queue 222. For each such entry 228 pulled or read from the queue 222, the packet delivery logic 227 retrieves the packet stored at the memory block 213 pointed to by the entry's pointer 232 and writes this data to buffers 205 (FIG. 6). As described above, the packet delivery logic 227 preferably writes, to the same buffer 205, the data portion 181 (FIG. 5) of each packet comprising data retrieved from the same buffer 126 of FIG. 1. Furthermore, after pulling or reading an entry 228 from the queue 222, the packet delivery logic 227 preferably returns the entry 228 to the packet pointer pool 221. The foregoing has the effect of freeing the memory block 213 identified by the returned entry 228 such that the receive logic 224 may write data from a newly received packet into the identified memory block 213 after pulling the returned entry 228 from the pool 221.

Note that the queue logic 229 preferably orders the entries 228 within the queue 222, based on their sequence indicators 161, such that the sequence indicators 161 of the entries 228 output from the queue 222 are in the same sequence or sequential order as the sequence indicators 161 of the packets transmitted from the transmitting unit 111. Thus, the packet delivery logic 227 stores, to the buffers 205, the data packets in the same sequence or sequential order that the packets were transmitted from the transmitting unit 111.

In an exemplary embodiment, the packetization logic 145 (FIG. 2) may control or assign the sequence indicators 161 such that the sequence indicator 161 of each packet packetized by the packetization logic 145 is incremented relative to the preceding packet. Further, the logic 145, except when retransmitting a packet in response to a retransmission request, generally transmits packets in the same order that they were packetized by the logic 145. Thus, in general, the difference between the sequence indicators 161 of two data packets consecutively transmitted by the transmitting unit 111 is one (1) unless one of the packets is a retransmission in response to a retransmission request. Accordingly, the queue logic 229 may be configured to order the queue's output such that the next entry 228 output via the output port 226 has a sequence indicator 161 that is one higher than the sequence indicator 161 of the last entry 228 output from this port 226. If the entry 228 having the next sequential indicator 161, as compared to the last entry 228 output from the queue 222, is not yet in the queue 222, then the queue logic 229 preferably waits on this entry 228 until it arrives in the queue 222 before outputting another entry 228. Once the entry 228 having the next sequential indicator 161 arrives in the queue 222, the queue logic 229 writes this entry 228 to the output port 226.

Further, if a new entry 228 is not output via the write port 226 when the packet delivery logic 227 is ready to pull or read a new entry 228 from the queue 222, the packet delivery logic 227 may stall or, in other words, wait until a new entry 228 appears in the output port 226. Thus, if the entry 228 having the next sequential indicator 161 is not in the queue 222 when the packet delivery logic 227 is ready to pull or read a new entry 228 from the queue 222, then the packet delivery logic 227 stalls. Note that an absence of such an entry 228 from the queue 222 generally indicates that the corresponding packet (i.e., the packet pointed to by the entry's pointer 232) is missing or, in other words, has yet to be received by the receiver 201.

Once the missing packet is received thereby prompting the insertion, into the queue 222, of the entry 228 having the next sequential indicator 161, the queue logic 229 outputs the entry 228 via the queue's output port 226, as described above. The packet delivery logic 227 then ends its stall and reads the entry 228 from the output port 226. Upon reading the foregoing entry 228 from the queue 222, the packet delivery element 227 retrieves the corresponding data packet, which is stored in the memory block 213 identified by the entry's pointer 232. The packet delivery logic 227 then stores the data portion 181 (FIG. 5) of this packet in one of the buffers 205 (FIG. 6).

As described above, the receive logic 224 provides, to the flow control logic 225, the retransmission indicator 185 and sequence indictor 161 of each packet stored in the pool 221. Similarly, the packet delivery logic 227 preferably transmits, to the flow control logic 225, the sequence indicator 161 of each entry 228 pulled or read from the queue 222 and, therefore, the sequence indicator 161 of each packet retrieved by the delivery logic 227. Based on the values provided by the receive logic 224 and packet delivery logic 227, the flow control logic 225 may track which packets have been received by the receiver 201 and, more specifically, determine whether there are any packets missing from the packets received by the receiver 201, as will be described in more detail below.

In this regard, the flow control logic 225 may detect a missing packet by determining when the sequence indicators 161 of two consecutive data packets processed by the receive logic 224 are not consecutive. For example, if a set of three consecutively received data packets have sequence indicators 161 corresponding to the values of "10," "11," and "12," then the flow control logic 225 determines that there are no missing data packets between the first and last packets of the set. In particular, the sequence indicator 161 of each consecutive data packet is incremented relative to the sequence indicator 161 of the preceding packet received before it. However, if the set of sequence indicators 161 instead corresponds to the values of "10," "11", and "13," then the flow control logic 225 preferably detects that the packet having a sequence indicator 161 corresponding to "12" is missing.

Moreover, the flow control logic 225 preferably maintains a list 233 of missing data packets. In this regard, for each missing data packet detected by the flow control logic 225, the logic 225 adds the sequence identifier 161 of the missing data packet to the list 233. Once a missing data packet is received by the logic 224, the flow control logic 225 removes the sequence indicator 161 of this packet from the list 233. Therefore, the list 233 identifies each missing data packet detected by the flow control logic 225 until such data packet is received by the receive logic 224. For each missing data packet identified by the list 233, the flow control logic 225 periodically determines whether a retransmission request for the missing data packet is to be generated, as will be described in more detail hereinbelow.

It should be noted that the network interface 215 and each set of logic 208, 224, 225, 227, and 229 depicted by FIGS. 6 and 7 may be implemented in hardware, software, or any combination thereof. In an exemplary embodiment illustrated by way of example in FIG. 9, the network protocol layer 217 and each set of logic 208, 224, 225, 227, and 229, along with their associated methodology, are implemented in software and stored in memory 206 of a computer system 243. Note that any portion of the network protocol layer 217 and the logic 208, 224, 224, 227, and 229, when implemented in software, can be stored and transported on a computer-readable medium.

Figure 9:
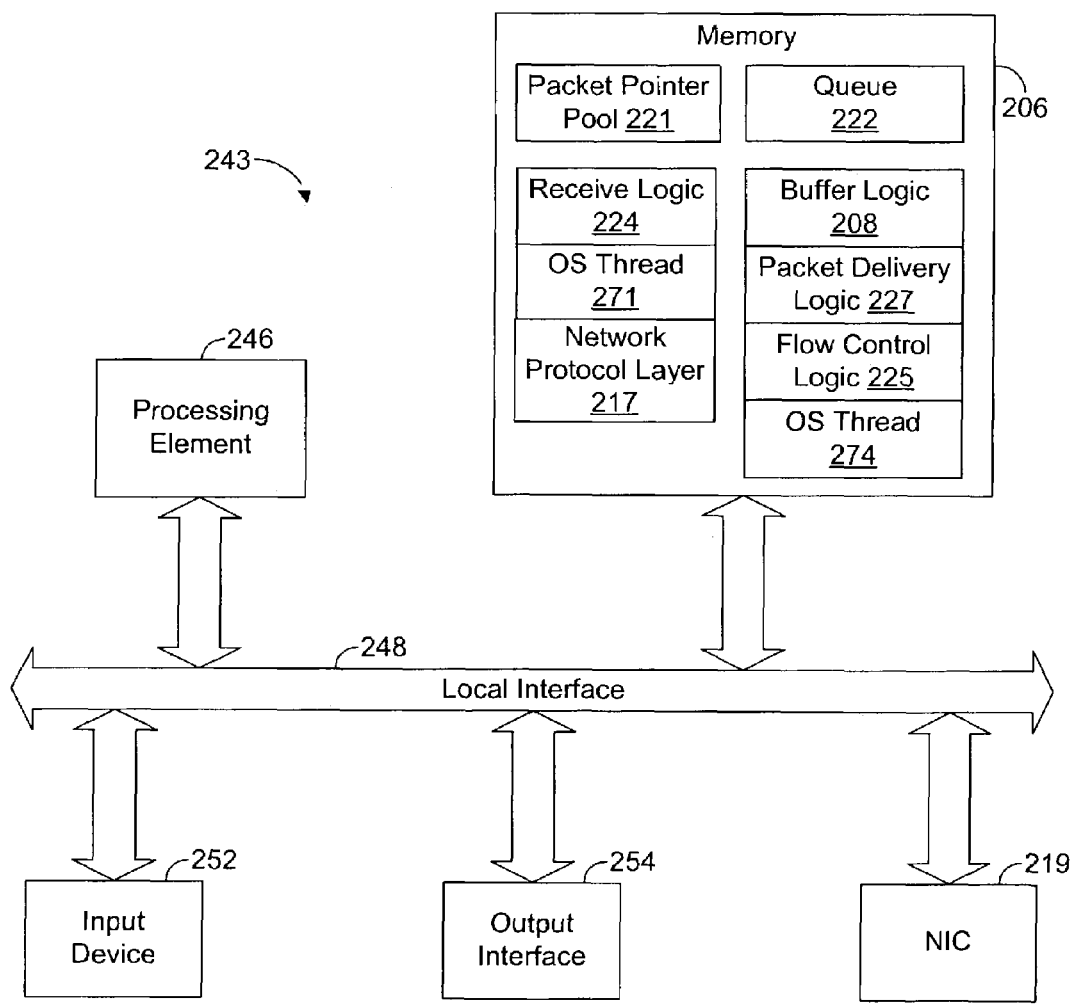
FIG. 9 is a block diagram illustrating an exemplary computer system that may be employed to implement a receiving unit, such as is depicted in FIG. 7.

As shown by FIG. 9, the computer system 243 comprises at least one conventional processing element 246, such as a digital signal processor (DSP) or a central processing unit (CPU), that communicates to and drives the other elements within the system 243 via a local interface 248, which can comprise one or more buses. Furthermore, an input device 252, for example, a keyboard or a mouse, can be used to input data from a user of the system 243, and an output device 254, for example, a screen display or a printer, can be used to output data to the user.

In addition, as shown by FIG. 9, in order to increase the rate at which packets can be successfully received, the network protocol layer 217 and receive logic 224 preferably run on an operating system (OS) thread 271, and the other software components of the receiver 201 preferably run on at least one different OS thread 274. In particular, the buffer logic 208, flow control logic 225, and packet delivery logic 227 run on OS thread 274 in the embodiment shown by FIG. 9. As a result, the OS thread 271 is not burdened with the tasks of performed by such components but rather is dedicated to tasks for receiving data packets from the network 114 and storing such packets into the packet pool 221. Therefore, the receive logic 224 is able to process data packets at a faster rate thereby decreasing the number of data packets that are lost or, in other words, not successfully received by the receiver 201. The foregoing has the effect of reducing retransmission requests thereby reducing the communication burdens of the system 100.

The flow control logic 225, for each missing data packet, is preferably configured to determine a value, referred to hereafter as the missing data packet's "queue position," indicative of the number of entries 228 that are to be pulled or read from the queue 222 before the pointer entry 228 that points to the missing data packet. Note that such an entry 228 is not actually inserted into the queue 222 until the missing data packet corresponding to (i.e., identified by) this entry is received and written to the packet pool 221. Continuing with the instant example where each consecutive data packet has an incremented sequence indicator 161, as described above, the queue position of a missing data packet is equal to the difference between the sequence indicator 161 of the missing data packet and the sequence indicator 161 of the entry 228 most recently pulled or read from the queue 222 by the packet delivery logic 227.

After determining the queue position of the missing data packet, the flow control logic 225 compares the queue position to a first threshold ("$TH_1$"). If the queue position is greater than $TH_1$, then the flow control logic 225 determines that there is sufficient time to wait for the missing data packet to be received by the receiver 201 before initiating a retransmission request for the missing data packet. Thus, the flow control logic 225 preferably refrains from initiating a retransmission request for the missing data packet if the queue position of the missing data packet is greater than $TH_1$.

However, once the queue position of the missing data packet falls below $TH_1$, the flow control logic 225 preferably determines that a sufficient amount of time has elapsed such that it can be assumed that the missing data packet is lost and, therefore, will not arrive at the receive logic 224. Thus, the flow control logic 225 generates a retransmission request and transmits the retransmission request via network interface 215, through the network 114 (FIG. 1) to the transmitting unit 111 that originally attempted to transmit the missing data packet. In a preferred embodiment, retransmission requests are transmitted to the transmitting unit 111 via TCP by writing such requests to TCP socket 223.

The aforementioned retransmission request preferably identifies at least the missing data packet (e.g., includes the sequence indicator 161 of the missing data packet) and identifies a first transport protocol that is to be used to retransmit the missing data packet. In one exemplary embodiment, the transmitting unit 111 is configured to originally transmit each data packet via UDPM, and the flow control logic 225 is configured to request that the retransmission occur according to the same transport protocol (i.e., UDPM) originally used to transmit the missing data packet. Note that UDPM is a very efficient protocol for transmitting data to a large number of receiving units 117. However, unlike some other protocols, such as TCP, for example, UDPM does not ensure that each packet is reliably received by each intended destination receiving unit 117.

When the transmitting unit 111 receives the aforementioned retransmission request, the transmitting unit 111 retrieves a copy of the missing data packet from one of the memory blocks 132 (FIG. 1) and initiates a retransmission of the missing data packet according to the transport protocol requested by the retransmission request. Thus, continuing with the aforementioned example, the queue logic 163 (FIG. 2) finds the entry 157 within the queue 159 corresponding with the missing packet. In this regard, the retransmission request preferably comprises the sequence indictor 161 of the missing packet, and the queue logic 263 finds the entry 157 having the same sequence indicator 161. Since the retransmission of the missing data packet is to occur via UDPM in this example, the queue logic 163 outputs the forgoing entry 157 via UDPM output port 164. In turn, the UDPM interface logic 165 retrieves the missing data packet from the memory block 132 identified by the entry 157 and writes this data packet, referred to hereafter as the "retransmitted packet," to the UDPM socket 154, which drives the retransmitted packet through the NIC 152 to the network 114. Unlike when the missing data packet was originally transmitted by the transmitting unit 111, the UDPM interface logic 165 preferably sets the retransmission indicator 185 of the retransmitted packet to indicate that this packet is a retransmission.

Referring to FIG. 7, once the flow control logic 225 of the receiver 201 has submitted the retransmission request described above, it is possible for the receiver 201 to receive either the originally transmitted missing data packet or the retransmitted packet. In either case, the receive logic 224 pulls an entry 228 from the pool 221 and stores the received packet to the memory block 213 pointed to by the pulled entry 228. The receive logic 224 then inserts the sequence indicator 161 of the received packet into the pulled entry 228 and inserts the pulled entry 228 into the queue 222 via input port 230. The receive logic 224 also transmits the retransmission indicator 185 and the sequence indicator 161 of the data packet to the flow control logic 225. Upon receiving the sequence indicator 161 of the missing data packet, the flow control logic 225 removes this sequence indicator 161 from the missing packet list 233.

However, it is also possible for both the originally transmitted missing data packet and the retransmitted packet to be lost or significantly delayed. Moreover, after submitting the aforementioned retransmission request and before receiving either the originally transmitted missing data packet or the retransmitted packet, the flow control logic 225 periodically compares the queue position of the missing data packet to a second threshold ("$TH_2$"). $TH_2$ is preferably set to a value such that there is sufficient time to submit a second retransmission request and to receive a second retransmitted packet in response to this second request before the packet delivery logic 227 is ready to pull or read the missing data packet from the queue 222.

If the missing data packet (i.e., either the originally transmitted missing data packet or the retransmitted packet) is not received by the receiver 201 before the queue position falls below $TH_2$, then the flow control logic 225 is preferably configured to submit a second retransmission request via TCP socket 223. However, rather than requesting retransmission via the same transport protocol requested via the previous retransmission request, the flow control logic 225 preferably requests retransmission according to a different transport protocol. In a preferred embodiment, this different protocol better ensures that any retransmitted data packet(s) arrive at their destinations as compared to the transport protocol requested via the previous retransmission request. Thus, in the instant example where communication of the missing data packet previously occurred via UDPM as described above, the flow control logic 225 may request TCP in the second retransmission request for the missing data packet.

In response to the second retransmission request, the transmitting unit 111 retrieves a copy of the missing data packet from one of the memory blocks 132 (FIG. 1) and initiates a retransmission of the missing data packet according to the transport protocol requested by the retransmission request. Thus, continuing with the aforementioned example, the queue logic 163 (FIG. 2) finds the entry 157 within the queue 159 corresponding with the missing packet. In this regard, the retransmission request preferably comprises the sequence indictor 161 of the missing packet, and the queue logic 263 finds the entry 157 having the same sequence indicator 161. Since the retransmission of the missing data packet is to occur via TCP in this example, the queue logic 163 outputs the forgoing entry 157 via TCP output port 173. In turn, the TCP interface logic 175 retrieves the missing data packet from the memory block 132 identified by the entry 157 and writes this data packet, referred to hereafter as the "TCP packet," to the TCP socket 156, which drives the retransmitted packet through the NIC 152 to the network 114. Unlike when the missing data packet was originally transmitted by the transmitting unit 111, the TCP interface logic 175 preferably sets the retransmission indicator 185 of the retransmitted packet to indicate that this packet is a retransmission.

Note that by utilizing the TCP socket 156, rather than the UDPM socket 154, to communicate the retransmitted packet, it is possible to bypass the UDPM packets that are waiting to be output from the queue 159. Thus, it is possible to quickly transmit the TCP packet from the session 139 in response to the foregoing retransmission request even when the UDPM interface logic 165 is busy handling UDPM packets from the queue 157.

When the TCP packet is indeed received via TCP socket 223, the flow control logic 225 pulls an entry 228 from the packet pointer pool 221 and stores the TCP packet into a memory block 213 pointed to by the pulled entry 228. The flow control logic 225 also inserts the sequence indicator 161 of the TCP packet into the pulled entry 228 and inserts the pulled entry 228 into the queue 222 via input port 230. The queue logic 229 then orders the entries 228 such that this newly inserted entry 228 is placed into its proper order within the queue 222. In other words, the queue logic 229 orders the entries 228 such that the newly inserted entry 228 is to be output between the entries 228 having the next highest sequence indicator 161 and the next lowest sequence indictor 161. Note that if $TH_2$ is properly set, then the newly inserted entry 228 is preferably input to the queue 222 before the packet delivery logic 227 attempts to pull or read it from the queue 222. Therefore, the operation of the packet delivery logic 227 should not be stalled or otherwise slowed due to the missing data packet or, in particular, due to an absence of the missing data packet's corresponding entry 228 from the queue 222.

Note that by having the flow control logic 225 to read TCP packets from the TCP socket 223 and the receive logic 224 to read UDPM packets from the UDPM socket 220, it is not necessary for the receive logic 224 to switch between reading the UDPM socket 220 and the TCP socket 223. Thus, inefficiencies and latencies pertaining to switching between reading the UDPM socket 220 and the TCP socket 223 are preferably not incurred by the receive logic 224, helping the receive logic 224 to read packets from the UDPM socket 220 at a more efficient rate.

According to the aforedescribed techniques, communication of data packets is initially attempted via a fast first transport protocol, such as UDPM. If a missing data packet is detected, then retransmission of the missing data packet according to the same fast transport protocol is preferably attempted until an attempt to pull or read the missing data packet's corresponding entry 228 from the queue 222 is imminent and, therefore, until an attempt to retrieve the missing data packet from the packet pool 221 is imminent. Once such a point is reached, a retransmission of the data packet using a more reliable transport protocol, such as TCP, is requested in an attempt to ensure that the missing data packet is available or at least close to becoming available when the packet delivery logic 227 is ready to pull or read the missing data packet's corresponding entry 228 from the queue 222. As a result, the initial attempts to use a fast and efficient transport protocol in lieu of a more reliable but perhaps less efficient transport protocol do not significantly impact the performance of the packet delivery logic 227 even when utilization of the fast and efficient transport protocol results in lost data packets.

To help optimize performance of the system 100, the thresholds $TH_1$ and $TH_2$ are preferably dynamically adjusted, based on the performance of the system 100, such that retransmission requests for missing data packets occur at more optimal times. In this regard, after submitting a retransmission request when the queue position of a missing data packet falls below $TH_1$, as described above, it is possible for the receiver 201 (FIG. 7) to receive the originally transmitted missing data packet. In such a case, it would have been desirable for the flow control logic 225 to wait longer before deciding whether to submit a retransmission request. In particular, if the logic 225 had waited until the originally transmitted missing data packet was received before deciding whether to submit a retransmission request, then the occurrence of a needless retransmission request for the missing data packet could have been prevented.

Therefore, when the receiver 201 receives the original transmission of a missing data packet after submitting a retransmission request for the missing data packet, the flow control logic 225 preferably decreases (e.g., decrements) $TH_1$. Thus, for the next missing data packet, the flow control logic 225 will wait longer before making a decision, based on $TH_1$, whether to submit a retransmission request. Note that the flow control logic 225 may determine whether a received missing data packet is an original transmission or a retransmission of the missing data packet based on the retransmission indicator 185 of the received packet.

If the receiver 201 receives a retransmission of a missing data packet without receiving the original transmission of the missing data packet, then it is possible that it would have been desirable for the flow control logic 225 to decide sooner whether to submit a retransmission request based on THE. Thus, in such a case, the flow control logic 225 preferably increases (e.g., increments) $TH_1$. By adjusting $TH_1$ in the manner described above, the flow control logic 225 automatically and dynamically sets $TH_1$ to a value close to or at its optimum value.

In addition, after submitting a retransmission request based on a comparison of the queue position of a missing data packet to $TH_2$, the flow control logic 225 preferably determines whether the packet delivery logic 227 is ready to retrieve the missing data packet before such packet is received from the network 114. In this regard, as described above, if the missing data packet's corresponding entry 228 is not in the queue 222 when the packet delivery logic 227 is ready to pull or read this entry 228 from the queue 222, then the packet delivery logic 227 may stall until the missing data packet is received and its corresponding entry 228 is inserted into the queue 222. Once the missing data packet's corresponding entry 228 is indeed inserted into the queue 222, the packet delivery logic 227 ends its stall, and the logic 227 then pulls or reads this entry 228 from the queue 222. The packet delivery logic 227 then continues with its normal operation.

Thus, if the packet delivery logic 227 stalls due to a missing data packet, then it would have been desirable for the flow control logic 225 to have requested the TCP retransmission of the missing data packet sooner in order to prevent the logic 227 from stalling due to the missing data packet. To help prevent or reduce future stalls of the packet delivery logic 227, the flow control logic 225 preferably increases (e.g., increments) $TH_2$ in response to a determination that the missing data packet caused a stall of the packet delivery logic 227. Thus, the next submission of a TCP retransmission request for a missing data packet will occur such that there is more time between submission of the TCP retransmission request and the time that the packet delivery logic 227 will be ready to pull or read the missing data packet's corresponding entry 228 from the queue 222. As such, a stall of the packet delivery logic 227 due to this missing data packet may be prevented or at least shortened.

Conversely, if the packet delivery logic 227 does not stall due to a missing data packet once a TCP retransmission request for the missing data packet has been submitted, then the missing data packet arrived at the receiver 201 and its corresponding entry 228 was inserted into the queue 222 before the packet delivery logic 227 was ready to pull or read the missing packet's corresponding entry 228 from the queue 222. Thus, it is possible that the flow control logic 225 could have waited longer, without causing a stall of the packet delivery logic 227, before requesting a TCP retransmission of the missing data packet. In such a situation, the flow control logic 225 preferably decreases (e.g., decrements) $TH_2$ in response to a determination that the missing data packet did not cause a stall of the packet delivery logic 227.

Thus, the next generation of a TCP retransmission request for a missing data packet will occur such that there is less time between submission of the TCP retransmission request and the time that the packet delivery logic 227 will be ready to pull the missing data packet's corresponding entry 228 from the queue 222. In other words, the flow control logic 225 waits longer before submitting a TCP retransmission request for the next missing data packet. Waiting longer before submitting a TCP retransmission request may be desirable to provide the system 100 with more time to get the missing data packet to the receiver 201 before the TCP retransmission request is generated, thereby increasing the chances that the need or desire of actually generating the TCP retransmission request will be obviated.

Moreover, by performing the aforedescribed techniques, $TH_2$ is dynamically kept within a desired range of values. In this regard, performing the aforedescribed techniques generally causes TCP retransmission requests for missing data packets to be submitted by the flow control logic 225 such that a TCP retransmission of a missing data packet is received and its corresponding entry 228 is inserted into the queue 222 just before the packet delivery logic 227 is ready to pull or read this entry 228 from the queue 222.

It should be noted that there may be times when the packet delivery logic 227 is stalled for a significant amount of time despite the efforts described herein for enhancing the communication efficiency of the system 20. For example, successful retransmission of a missing packet to the receiver 201 may be significantly delayed such that the packet delivery logic 227 is stalled for a significant amount of time. In another example, a graphics application 121 may temporarily stop producing data for a significant amount of time causing the queue 222 to empty. Thus, the packet delivery logic 227 may stall until the application 121 resumes and begins to produce graphical data again so that the receive logic 224 begins to receive packets and insert pointer entries 228 into the queue 222.

When the packet delivery logic 227 is stalled, it may be desirable to put the logic 227 to sleep in order to prevent the logic 227 from needlessly consuming the processing resources of the receiver 201. Such an effect can be achieved by submitting a blocking call to the OS thread 274 (FIG. 9) that is running the packet delivery logic 227. As an example, for a Posix-based OS thread, a "select" call may be made in order to put a component, such as the packet delivery logic 227, to sleep. Once the queue 222 outputs an entry 228 to be read by the packet delivery logic 227, the OS thread 274 may be configured to awaken the logic 227 such that the logic 227 resumes its normal operation. However, there is a latency associated with putting the logic 227 to sleep and awakening the logic 227. Further, transitioning of the packet control logic 227 into and out of sleep states consumes processing resources of the receiver 201. It is possible for the cost of putting the packet delivery logic 227 to sleep, as described above, may outweigh the benefits of such an action, particularly when the logic 227 would be put to sleep only for a relatively short amount of time.

Thus, in one exemplary embodiment, the packet delivery logic 227 is preferably configured to remain awake for at least a short amount of time after a stall is initiated. In this regard, as shown by FIG. 7, the packet delivery logic 227 may comprise a timer 278 that may be used to track time in accordance with known or future-developed techniques. The packet delivery logic 227 is configured to activate the timer 278 in response to a stall of the logic 227 in order to determine when a predefined amount of time has elapsed since initiation of the stall. If a new entry 228 is ready to be pulled or read from the queue 222 prior to expiration of the predefined amount of time, then the packet delivery logic 227 is preferably configured to read and process the entry 228, as described above, without entering into a sleep state. However, if no such entry 228 becomes available prior to expiration of the predefined amount of time, then the packet delivery logic 227 is preferably configured to enter into a sleep state. By waiting for expiration of the predefined amount of time before entering into a sleep state, the packet delivery logic 227 is prevented from entering into a sleep state when there is only a short delay in the output of a new entry 228 by the queue 222.

Furthermore, before actually entering into a sleep state, the packet delivery logic 227 preferably notifies the queue logic 229 of its intent to go to sleep. In response to such a notification, the queue logic 229 determines whether the queue 222 has recently received any entries 228 that are about to be output via output port 226. The queue logic 229 then notifies the packet delivery logic 227 whether any such entries 228 exist. If any such entries 228 do exist, then the packet delivery logic 227 preferably refrains from entering a sleep state since any such sleep state would last only for a short amount of time. In this regard, if the packet delivery logic 227 entered into a sleep state, the logic 227 would be awakened a short time later in order to read and process the aforementioned entry 228 that is about to be output from the queue 222. In such a situation, any benefits associated with entering the sleep state would likely be outweighed by the costs of causing the packet delivery logic 227 to transition into and out of the sleep state.

Alternatively, if the queue logic 229 informs the packet delivery logic 227 that it has detected no entries 228 that are about to be output from the queue 222, then the packet delivery logic 227 preferably enters into a sleep state thereby preventing the logic 227 from needlessly usurping the processing resources of the receiver 201. Due to the aforementioned notification previously transmitted from the packet delivery logic 227 to the queue logic 229, the queue logic 229 is aware of when the packet delivery logic 227 enters into a sleep state. In this regard, the packet delivery logic 227 enters into a sleep state when the logic 227 submits a notification of its intent to enter into a sleep state and the queue logic 229 responds with an indication that it has detected no entries 228 that are about to be output from the queue 222.

Moreover, when the packet delivery logic 227 enters a sleep state, the queue logic 229 is preferably configured to awaken the packet delivery logic 227 when the queue logic 229 detects an entry 228 that is about to be output from the queue 222. For example, the queue logic 229 may awaken the packet delivery logic 227 when the logic 229 detects the next entry 228 that is to be output from the queue 222. By providing the packet delivery logic 227 with advanced notice that a new entry 228 is about to be output from the queue 227, the transition of the packet delivery logic 227 from a sleep state to an active state may begin before the new entry 228 is output from the queue 222. Thus, the packet delivery logic 227 may be ready to read this new entry 228 sooner than would otherwise be possible had the advanced notice of the entry 228 not been provided by the queue logic 229. By having the packet delivery logic 227 transition into and out of sleep states according to the aforedescribed techniques, the overhead associated with periodically putting the packet delivery logic 227 to sleep in response to stalls of the logic 227 can be reduced thereby helping to improve the efficiency of the receiver 201.

Note that the techniques described above for transitioning the packet delivery logic 227 into and out of sleep states may be employed to transition the interface logic 165 (FIG. 2) into and out of sleep states as well. In this regard, the interface logic 165 may be configured to enter into a sleep state a predefined amount of time after a stall of the interface logic 165 is initiated due to the absence of a new entry 157 to be pulled or read from the queue 159. However, before entering into a sleep state, the logic 165 may first notify the queue logic 163. If the queue logic 163 detects no entries 157 that are about to be output from the queue 159, then the interface logic 165 may enter into a sleep state. Once the interface logic 165 enters a sleep state, the queue logic 163 may be configured to awaken the interface logic 165 in response to a detection of an entry 157 that is about to be output from the queue 159. Thus, the same techniques used to reduce the overhead associated with putting the packet delivery logic 227 of the receiver 201 to sleep may also be employed to reduce the overhead associated with putting the interface logic 165 of the transmitting unit 111 to sleep.

An exemplary use and operation of the communication system 100 and associated methodology are described hereafter.

Assume that the transmitting device 111 of FIG. 1 is configured to transmit graphical data via a sequence of n data packets to a plurality of receivers 201, referred to hereafter as "destination receivers," residing within a plurality of remote receiving units 117, where "n" is any positive integer number. Furthermore, assume that, except in certain circumstances when retransmitting a missing data packet, the transmitting device 111 and network 114 are configured to transmit the foregoing packets via UDPM, although other types of protocols may be employed in other embodiments.

In the instant example, the graphics application 121 produces graphical data, which is temporarily stored into buffers 126 by buffering logic 124. The communication session 139 retrieves this graphical data from the buffer 126, and the packetization logic 145 packetizes this retrieved data into the data packets that are to be communicated to the receiving units 117.

When packetizing the graphical data, the packetization logic 145 preferably sets the retransmission indicator 185 of each resulting packet to indicate that the packet is not a retransmission but is rather an original transmission of the data contained in the data portion 181. For illustrative purposes, each retransmission indicator is a one-bit value, which is asserted only when its data packet is a retransmission. In such an example, the packetization logic 145 deasserts the retransmission indicator 185 of each of the foregoing packets to be transmitted from the transmitting unit 111.

The packetization logic 145 also sets the sequence indicators 161 of the data packets based on the transmission sequence of the data packets. For illustrative purposes, the packetization logic 145 sets the sequence indicator 161 of the first transmitted packet of the sequence to a value of one (1) and sets the sequence indicator of each consecutively transmitted packet to a successively higher integer value. Thus, the sequence indicator 161 of the second packet of this example is set to two (2), and the sequence indicator 161 of the third packet is set to three (3). Further, the sequence indicator 161 of the fourth packet is set of four (4), and so on.

In order to effectuate transmission of each of the data packets, the packetization logic 145 pulls a pointer entry 157 from the packet pointer pool 149 and writes the packet to the memory block 132 pointed to by the pulled entry 157. In packetizing the data packet, the logic 145 assigns a sequence indicator 161 to the packet and stores this sequence indicator 161 in the packet's header 183 (FIG. 5) as well as in the pulled entry 157. The packetization logic 145 then inserts the pulled entry 157 into the queue 159. In this regard, the packetization logic 145 inserts the entries 157 into the queue 159 such that the data packets are transmitted in the sequential order described above. Noting that the packets are generally transmitted in the same order that corresponding entries 157 (i.e., entries having the same sequence indicator 161) are inserted into the queue 159, the packetization logic 145 inserts the entries 157 into the queue 159 such that the sequence indicators 162 of consecutively inserted entries 157 have successively higher values. Thus, continuing with the instant example, the sequence indicator 161 of the first entry 157 inserted into the queue 159 is one (1), and the sequence indicator 161 of the second entry 157 inserted into the queue 159 is two (2). Further, the sequence indicator 161 of the third entry 157 inserted into the queue 159 is three (3), and so on.

In an effort to set the transmission of the transmitting unit 111 to a more desirable rate, the queue logic 163 preferably limits the number of pending entries 157 that may be stored in the queue 159 during a particular time period. For example, assume that the queue logic 163 is initially configured to enable the packetization logic 145 to insert, into the queue 159, up to one-hundred (100) pending entries 157 every three-hundred (300) micro-seconds. In such an example, as shown by block 281 of FIG. 10, the queue logic 159 initializes a threshold, referred to hereafter as the "entry threshold," to one-hundred (100), which corresponds to the maximum number of pending entries 157 that may be stored in the queue 159 at any given time until the entry threshold is later changed. For illustrative purposes, each consecutive three-hundred (300) micro-second time period will be referred to hereafter as a "transmission period."

During the first transmission period, the queue logic 163 enables the packetization logic 145 to insert entries 157 into the queue 159 until the number of pending entries 157 in the queue 159 reaches the entry threshold, as shown by block 284. Once this occurs, the queue logic 163 disables the packetization logic 145 from inserting any more entries 157, at this point, even if the packetization logic 145 has more entries 157 to insert. As an example, assume that the packetization logic 145 initially has two-hundred (200) entries 157 to insert the queue 159. In such an example, the packetization logic 145, during the first transmission period, is enabled to insert the first one-hundred five (100) of these entries 157 into the queue 159.

After the foregoing entries 157 are inserted into the queue 159, the queue logic 163 begins outputting the entries 157 in the same order that they were received by the queue 159. Thus, in block 286, the queue logic 163 writes, to the output port 164, the next pending entry 157 to be output from the queue 159. While this entry 157 is being read by the UDPM interface logic 165, the queue logic 163 determines whether any acknowledgments or retransmission requests have been received, as shown by decision block 288. If any such messages (i.e., acknowledgments or retransmission requests) have been received, then the queue logic 163 may expire one or more entries 157 based on the received acknowledgment or retransmission request, as shown by block 289. In this regard, an acknowledgement or retransmission request preferably comprises data indicative of the sequence indicator or indicators 161 of the packet or packets at issue. Further, the queue logic 159 may assume that any packet transmitted prior to a packet identified by a received acknowledgement or retransmission request has been successfully received by the prior packet's destination if a retransmission request for such a prior packet has yet to be received. Thus, the queue logic 163 preferably expires each entry 157 having a sequence indicator 161 corresponding to any such prior transmitted packet. The queue logic 163 returns each expired packet 157 to the packet pointer pool 149.

As shown by decision block 291, the queue logic 163 preferably services any retransmission request detected in block 288. In this regard, for such a request, the queue logic 163 finds, in the queue 159, the entry 157 corresponding to (e.g., having the same sequence indicator 161 as) the requested packet. The queue logic 163 then outputs this entry 157 to one of the output ports 164 or 173 depending on the type of protocol that is to be used to retransmit the requested packet. In response, the requested packet is retrieved and retransmitted.

As shown by decision block 293, the queue logic 163 determines whether there are any pending entries 157 to be output from the queue 159. If there are any such entries 157, the queue logic 163 determines whether the current transmission period has expired in block 295. If not, the queue logic 163 repeats blocks 286, 288, 293, and, if appropriate, blocks 289 and 291. However, if the current transmission period has expired, the queue logic 163 proceeds to block 296, which will be described in more detail hereinbelow.

If the queue logic 163 determines, in block 293, that there are no pending entries 157 to be output from the queue 159, the queue logic 163 proceeds to block 298 and determines whether the current transmission period has expired. If not, the queue logic 163 determines whether any new acknowledgments or retransmission requests have been received from the receiving units 117. If so, the queue logic 163 expires entries 157 in block 301 and services any new retransmission request in block 302 via the same techniques described above for blocks 289 and 291.

If the queue logic 163 determines, in block 295 or 298, that the current transmission period has expired, then the logic 163 determines, in block 296, the total number of retransmission requests that were received during the just expired transmission period. As shown by blocks 305 and 306, the queue logic 163 increases the entry threshold if the total number of retransmission requests falls below $TH_L$. Further, as shown by blocks 308 and 309, the queue logic 163 decreases the entry threshold if the total number of retransmission requests exceeds $TH_H$. After adjusting the entry threshold in blocks 306 or 309, if appropriate, the queue logic 163 proceeds to block 284 and repeats the aforedescribed process such that additional entries 157 can be inserted into the queue 159 thereby initiating the transmission of more data packets.

Figure 10:
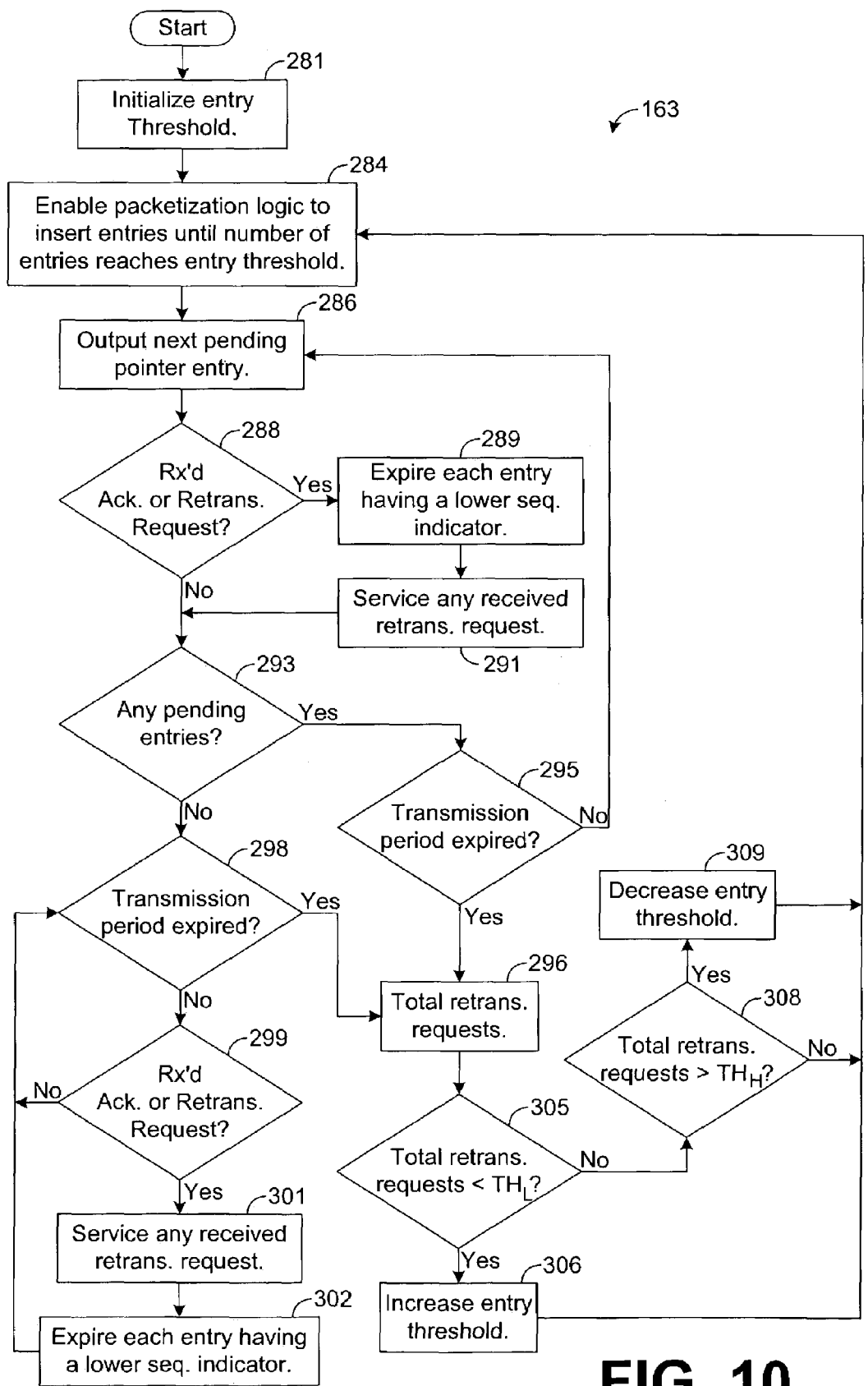
FIG. 10 is a flow chart illustrating an exemplary architecture and functionality of queue logic, such as is depicted in FIG. 2.

By implementing the aforedescribed process shown by FIG. 10, the queue logic 163 adjusts the transmission rate of the session 139 such that a more optimum transmission rate is achieved. In particular, if the current transmission rate of the session 139 induces a large number of retransmission requests, then the queue logic 163 may decrease the transmission rate by decreasing the entry threshold thereby reducing the number of retransmission requests that will be generated. Further, if the current transmission rate of the session 139 induces a small number of retransmission requests, then the queue logic 163 may increase the transmission rate of the session 139 by increasing the entry threshold.

Figure 11:
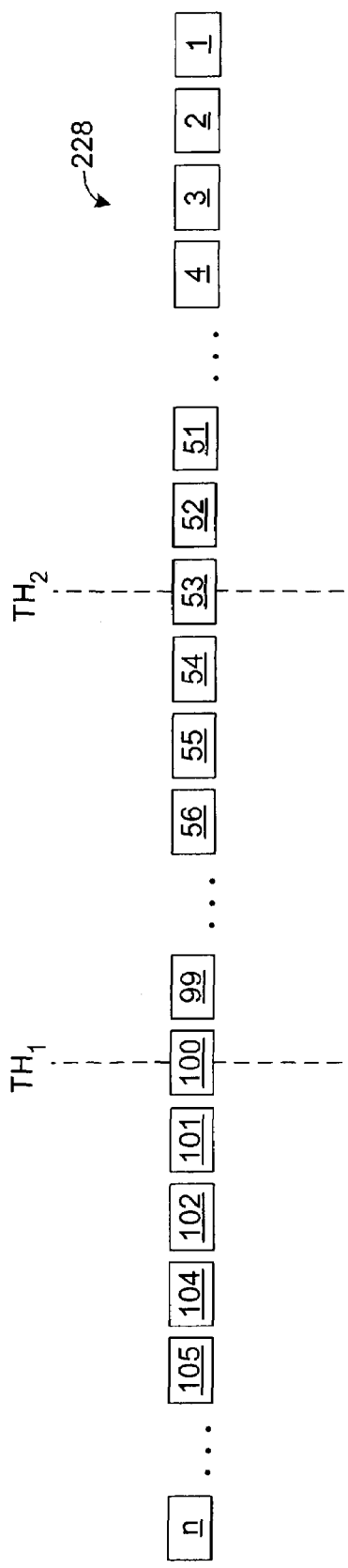
FIG. 11 is a block diagram illustrating an exemplary sequence of data packets stored within a packet queue, such as is depicted in FIG. 6.

As each destination receiver 201 receives the aforementioned data packets, the data packets are written to memory blocks 213 and corresponding pointer entries 228 from the packet pointer pool 221 are inserted into the queue 222. Assume that one of the receivers 201, referred to hereafter as the "requesting receiver 201," receives each data packet of the sequence except one, referred to hereafter as the "missing data packet." Further assume that the sequence indicator 161 of the missing data packet was assigned a value of "103" by the packetization logic 145. FIG. 11 is a possible illustration of the pointer entries 228 in the queue 222 in such an example. In this regard, as shown by FIG. 11, pointer entries 228 corresponding to each of the aforementioned data packets, except the missing data packet, are stored in the queue 222. Note that the reference number within each entry shown in FIG. 11, as well as the succeeding FIGS. 12 and 13, corresponds to the value of the entry's sequence indicator 161. Thus, as shown by FIG. 11, entry 103 is missing from the queue 222 indicating that its corresponding data packet has yet to be received by the receiver 201 and stored in the packet queue 221. In addition, for illustrative purposes, assume that $TH_1$ corresponds to a value of one-hundred (100) and that $TH_2$ corresponds to a value of fifty-three (53).

Based on the information provided to the flow control logic 225 by the receive logic 224 of the requesting receiver 201, the flow control logic 225 determines that packet having a sequence indicator value of one-hundred-three (103) is missing. Thus, the flow control logic 225 stores the value of one-hundred-three (103) into the missing packet list 233 and performs the process depicted by FIG. 14 for each missing data packet identified by the list 233. Note that the flow control logic 225 may concurrently perform the process depicted by FIG. 14 for multiple missing data packets.

Figure 14:
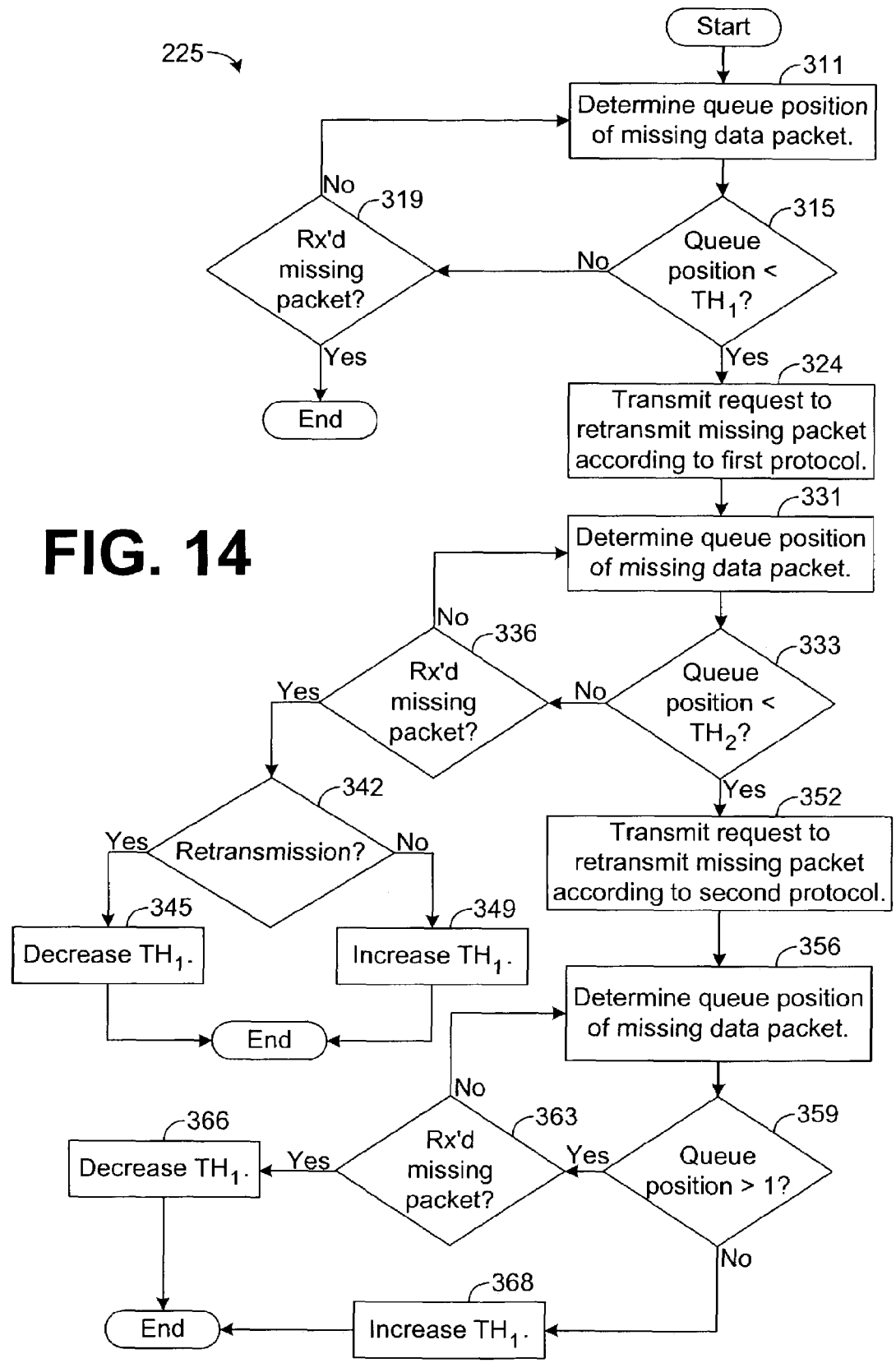
FIG. 14 is a flow chart illustrating an exemplary architecture and functionality of flow control logic, such as is depicted in FIG. 7.

Moreover, as shown by block 311 of FIG. 14, the flow control logic 225 determines a value indicative of the queue position of the missing data packet. The queue position preferably corresponds to a value equal to x+1, where "x" represents the number of queue entries that are to be pulled from the queue 222 prior to the missing data packet's corresponding entry 103. Assuming that entry 1 is to be the next entry pulled from the queue 222, there are one-hundred-two entries (i.e., entries 1–102) that are to be pulled from the queue 222 prior to the missing packet's entry 103. Therefore, the current queue position of the missing packet is one-hundred-three (103). Note that the queue position of the missing data packet may be generally determined by subtracting the value of the sequence indicator 161 of the last entry pulled from the queue 222 and the value of the sequence indicator 161 of the missing data packet.

Thus, when the packet delivery logic 227 pulls an entry from the queue 227, the logic 227 may transmit the sequence indicator 161 of this entry to the flow control logic 225. The flow control logic 225 may then subtract this indicator 161 from the sequence indicator 161 of the missing data packet to determine the queue position of the missing data packet.

In decision block 315 of FIG. 14, the flow control logic 225 determines whether the current queue position of the missing packet is less than $TH_1$. In the instant example, the current queue position (i.e., 103) is greater than $TH_1$ (i.e., 100), and a "no" determination is made in decision block 315. The flow control logic 225 then determines, in decision block 319, whether the missing data packet has arrived at the receiver 201 based on the information provided by the receive logic 224. If so, the flow control logic 225 may discontinue the process shown by FIG. 14 for the missing data packet, and the process ends. In such an example, the flow control logic 225 does not request retransmission of the missing data packet, and the control logic 225 does not adjust the values of $TH_1$ and $TH_2$.

Figure 12:
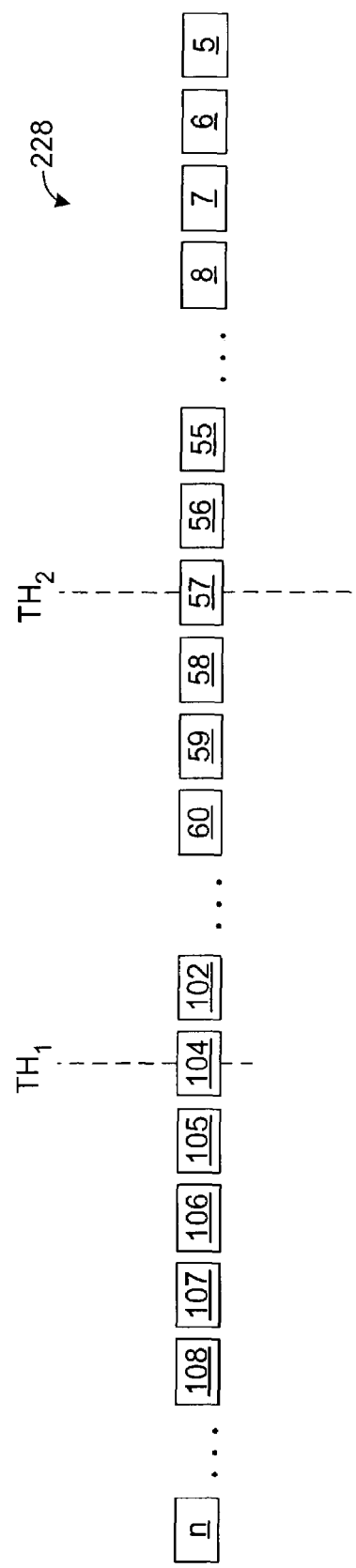
FIG. 12 is a block diagram illustrating the sequence of data packets of FIG. 11 once four of the packets have been pulled from the packet queue.

However, assuming that the missing data packet is not yet received by the requesting receiver 201 during block 319, the flow control logic 225 repeats blocks 311 and 315, as shown by FIG. 14. Once the packet delivery logic 227 pulls four entries (i.e., entries 1–4) out of the queue 225, the queue position of the missing packet falls below $TH_1$. In this regard, FIG. 12 is a possible illustration of the entries 228 in the queue 222 once entries 1–4 have been pulled from the queue 222. In the example shown by FIG. 12, there are ninety-eight (98) entries (i.e., entries 5–102) that are to be pulled from the queue 222 prior to the missing data packet. Thus, the queue position of the missing data packet is ninety-nine (99), which is one less than $TH_1$.

Once the missing packet's queue position falls below $TH_1$, a "yes" determination is made upon the next performance of block 315. Thus, as shown by block 324, the flow control logic 225 transmits a retransmission request for the missing data packet to the transmitting device 111 via network 114. This retransmission request preferably requests retransmission of the missing data packet via UDPM and will be referred to hereafter as the "UDPM retransmission request."

In response to the UDPM retransmission request, the transmitting unit 111 (FIG. 1) retrieves a copy of the missing data packet from a memory block 213 and, based on this data, retransmits the missing data packet via the requested transport protocol (i.e., UDPM in the instant example). The transmitting unit 111 also sets the retransmission indicator 185 of this data packet to indicate that the packet is a retransmission. Continuing with the instant example, the transmitting unit 111 asserts the retransmission indicator 185.

Moreover, the retransmitted data packet is then received at each destination receiver 201 provided that there are no problems that would prevent any such receivers 201 from receiving the retransmitted packet. Note that if the retransmitted data packet is received at a particular receiver 201 before the receiver's flow control logic 225 reaches block 324 of FIG. 14, then the flow control logic 225 of such receiver 201 preferably does not submit a retransmission request for the missing data packet, even if the originally transmitted data packet is lost (i.e., is never received by the receiver 201). Thus, even when an originally transmitted data packet is lost and never received by any of the destination receivers 201, it is not necessary for each destination receiver 201 to submit a retransmission request for the lost packet. In this regard, when the first UDPM retransmission request is submitted by one of the destination receivers 201, a UDPM retransmission of the lost data packet is sent to each destination receiver 201.

Also note that multiple receivers 201 may generate and transmit a UDPM retransmission request for the same data packet according to the techniques described above. Such a situation may arise, for example, when multiple destination receivers 201 submit a UDPM retransmission request before receiving a UDPM retransmission of the missing data packet 103 from the transmitting device 111. However, as described above, when the transmitting unit 111 services one UDPM retransmission request from any one of the destination transceivers 201, a retransmission of the missing data packet 103 is sent to each destination receiver 201 according to UDPM standards. Thus, the other receivers 201 that also generated UDPM retransmission requests for the missing data packet may receive the retransmitted data packet regardless of whether the transmitting device 111 services the UDPM retransmission requests of these other receivers 201. Moreover, in order to eliminate needless retransmissions of the same data packet, the queue logic 163 preferably services only up to one UDPM retransmission request for each data packet of the communicated sequence of packets.

After transmitting a UDPM retransmission request, as described above, the requesting receiver 201 begins determining the current queue position of the missing data packet and comparing this queue position to $TH_2$, as shown by blocks 331 and 333 of FIG. 14. As shown by decision block 336, the flow control logic 225 also determines whether the missing data packet is received by the requesting receiver 201 based on the information provided from the receive logic 224. If the missing data packet is received, then the flow control logic 225 may end the process depicted by. FIG. 14. However, before ending such process, the flow control logic 225 preferably adjusts the value of $TH_1$.

In this regard, the flow control logic 225 determines, in decision block 342, whether the received missing data packet was from the original transmission of the missing data packet or from the retransmission of the missing data packet that occurred in response to the retransmission request transmitted in block 324. Specifically, continuing with the current example, the flow control logic 225 makes a "yes" determination in block 342 if the retransmission indicator 185 of the received missing data packet 103 is asserted. If the retransmission indicator 185 is instead deasserted, the flow control logic 225 makes a "no" determination in block 342.

As shown by block 345, the flow control logic 225 preferably decrements $TH_1$ if a "yes" determination is made in block 342. Further, as shown by block 349, the flow control logic 225 preferably increments $TH_2$ if a "no" determination is made in block 342.

Figure 13:
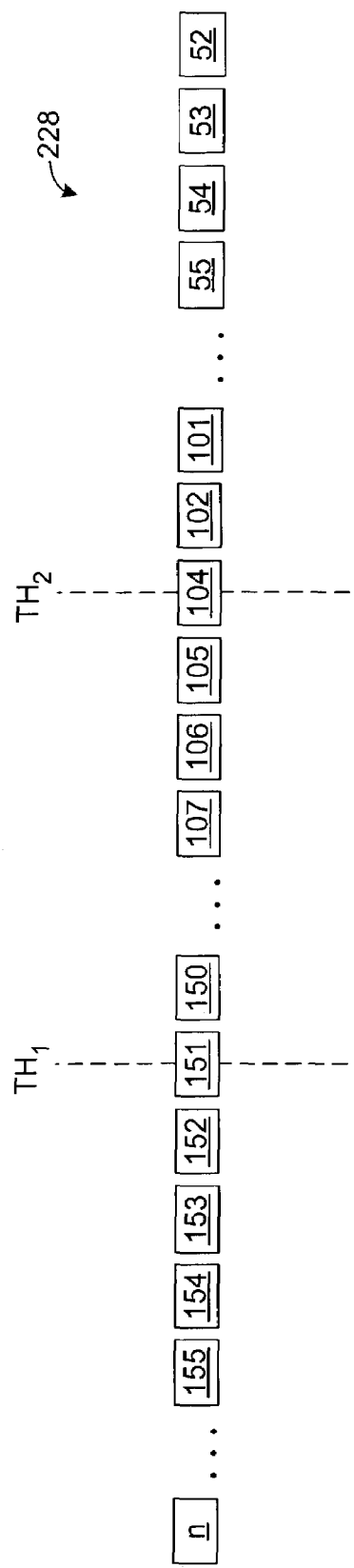
FIG. 13 is a block diagram illustrating the sequence of data packets of FIG. 11 once fifty-one of the data packets have been pulled from the packet.

Once the packet delivery logic 227 pulls entries 1–51 out of the queue 225, the queue position of the missing packet 103 falls below $TH_2$. In this regard, FIG. 13 is a possible illustration of the entries 228 in the queue 222 once entries 1–51 have been pulled from the queue 222. In the example shown by FIG. 13, there are fifty-one (51) entries (i.e., entries 52–102) that are to be pulled from the queue 222 prior to the missing data packet's corresponding entry 103. Thus, the queue position of the missing data packet is 52.

Once the missing packet's queue position falls below $TH_2$, a "yes" determination is made upon the next performance of decision block 333. Thus, as shown by block 352, the flow control logic 225 transmits a retransmission request for the missing data packet 103 to the transmitting device 111 (FIG. 1) via network 114. This retransmission request preferably requests retransmission of the missing data packet 103 via TCP and will be referred to as the "TCP retransmission request."

In response to the TCP retransmission request, the transmitting unit 111 (FIG. 1) retrieves the missing data packet from one of the memory blocks 132 and, based on this data, retransmits the missing data packet, to the requesting receiver 201 via the requested transport protocol (i.e., TCP in the instant example). The transmitting unit 111 also preferably sets the retransmission indicator 185 of this data packet to indicate that the packet is a retransmission.

After transmitting the TCP retransmission request, as described above, the flow control logic 225 determines the queue position of the missing data packet in block 356. The flow control logic 225 then determines whether the queue position is greater than a value of one (1) in decision block 359. If so, the flow control logic 225 determines, in decision block 363, whether the missing data packet 103 is received by the requesting receiver 201 based on whether the flow control logic 225 has read the missing data packet from the TCP socket 223. If not, the flow control logic 225 repeats blocks 356 and 359, as shown by FIG. 14.

Note that once the queue position reaches one (1), the packet delivery logic 227 stalls if the missing packet has yet to be received causing the missing packet's entry 103 to be absent from the queue 222. Thus, if the missing data packet is received prior to a "no" determination in block 359, then an absence of the missing data packet 103 from the queue 222 does not cause a stall of the packet delivery logic 227. Therefore, in such an example, the flow control logic 225 decrements $TH_2$, as shown by block 366. However, if a "no" determination is made in block 359, then the missing data packet caused a stall of the packet delivery logic 227. In such a situation, the flow control logic 225 increments $TH_2$, as shown by block 368, in an effort to prevent or reduce future stalls of the packet delivery logic 227.

Figure 15:
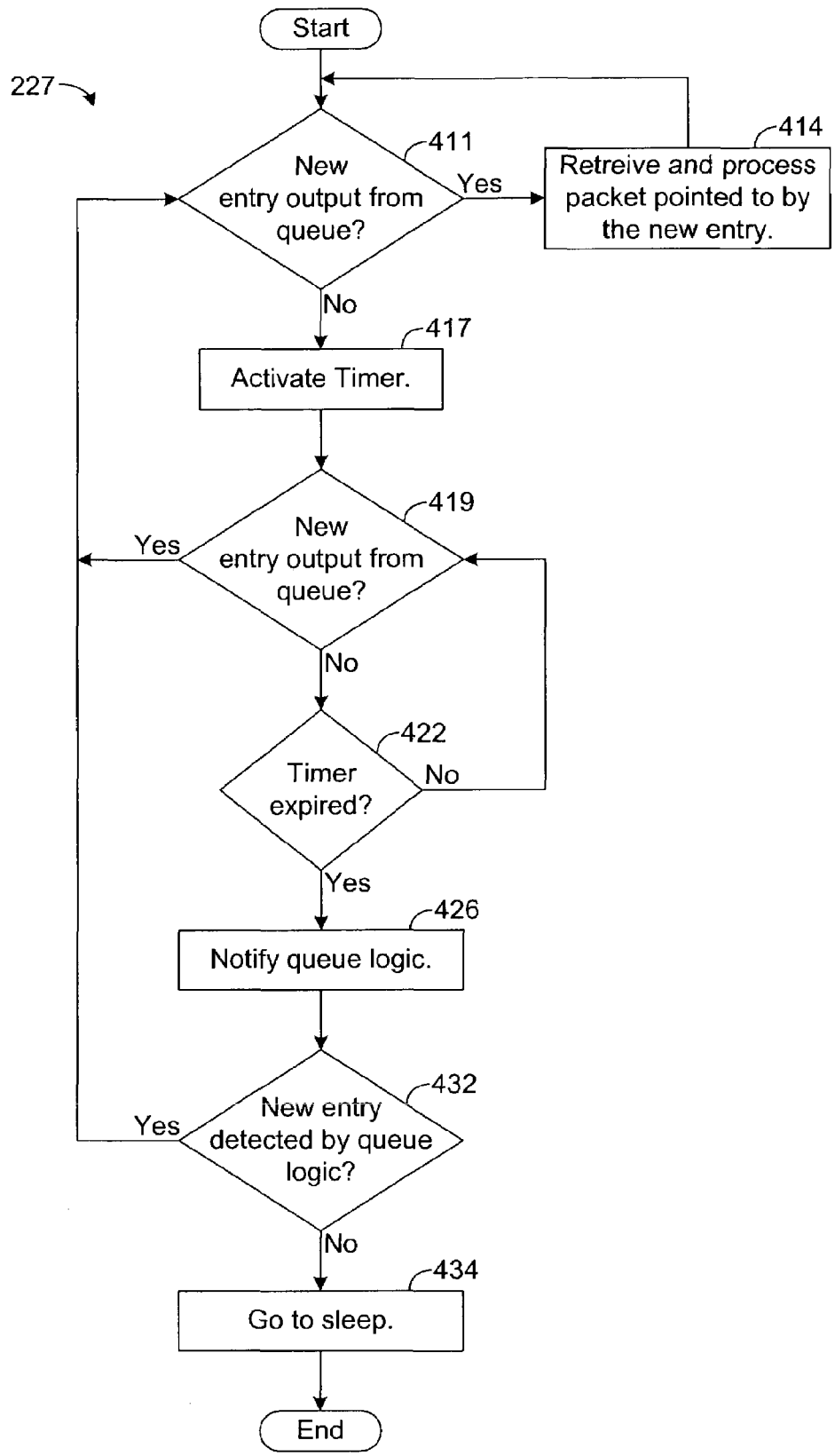
FIG. 15 is a flow chart illustrating an exemplary architecture and functionality of packet delivery logic, such as is depicted in FIG. 7.

While entries are passing through the queue 222 and monitored by the queue logic 229, the packet delivery logic 227 is reading and processing the entries 228 output from the queue 222. In this regard, as shown by blocks 411 and 414 of FIG. 15, for each new entry 228 output from the queue 222, the packet delivery logic 227 reads the entry 228 and retrieves the packet stored in the memory block 213 pointed to by the read entry 228. The logic 227 then stores the data of the packet into one of the buffers 205 (FIG. 6).

If the packet delivery logic 227 does not detect a new entry 228 output from the queue 222 in block 411, then the delivery logic 227 activates the timer 278 and continues checking the queue 222 for a new entry 228, as shown by blocks 417 and 419. Also, as shown by decision block 422, the packet delivery logic 227 determines when the timer 278 expires (i.e., determines when a predefined amount of time tracked by the timer 278 expires). If the timer 278 expires without a new entry 228 being output from the queue 222, then the packet delivery logic 227 provides the queue logic 229 with a notification indicating that the logic 227 will go to sleep unless there is a new entry 228 about to be output from the queue 222, as shown by block 426.

In response to the foregoing notification, the queue logic 229 determines whether the next entry 228 to be output from the queue 222 has been received by the queue 222. If not, the queue logic 229 provides the packet delivery logic 227 with an indication that it has detected no entries 228 that are about to be output from the queue 222. In response to this indication from the queue logic 229, the packet delivery logic 227 goes to sleep, as shown by blocks 432 and 434. However, if the queue logic 229 determines that the next entry 228 to be output from the queue 222 has been received by the queue 222, then the queue logic 229 provides the packet delivery logic 227 with an indication that a new entry 228 is about to be output from the queue 222. In response to such an indication, the packet delivery logic 227 proceeds to block 411 without entering into a sleep state.

If the packet delivery logic 227 enters into a sleep state in block 434, the queue logic 229 awakens the logic 227 when the queue logic 229 detects that the next entry 228 to be output from the queue 222 has been received by the, queue 222. Upon transitioning from the sleep state into an active state, the packet delivery logic 227 repeats the process depicted by FIG. 15.

The invention claimed is:

1. An apparatus for receiving data from networks, comprising:
    a network interface configured to receive a sequence of data packets from a network;
    a queue; and
    logic configured to store, in the queue, entries pointing to the data packets, the logic configured to detect when a data packet is missing from the sequence, the missing data packet having a queue position within the queue, the logic configured to select a transport protocol based on the queue position of the missing data packet and to initiate a retransmission of the missing data packet via the selected transport protocol.

2. The apparatus of claim 1, wherein the queue position is indicative of when an attempt to pull, from the queue, an entry pointing to the missing data packet is to occur.

3. The apparatus of claim 1, wherein the logic is configured to select the transport protocol based on a comparison of a threshold to a value indicative of the queue position.

4. The apparatus of claim 3, wherein the logic is configured to adjust the threshold based on a determination as to whether packet delivery logic stalls based on the missing data packet.

5. The apparatus of claim 3, wherein the logic is further configured to perform a comparison of the value to a second threshold and to determine whether to initiate a retransmission of the missing data packet via a different transport protocol based on the comparison of the value to the second threshold.

6. The apparatus of claim 3, wherein the logic is further configured to perform a comparison of the value to a second threshold and to adjust the second threshold based on a determination as to whether the network interface receives an original transmission of the missing data packet.

7. The apparatus of claim 1, wherein the logic is configured to initiate at least one retransmission of the missing data packet via a different protocol.

8. The apparatus of claim 7, wherein the selected protocol is transmission control protocol (TCP), and wherein the different protocol is user datagram protocol-multicast (UDPM).

9. An apparatus for receiving data from networks, comprising:
    a network interface configured to receive a sequence of data packets from a network; and
    logic configured to detect when a data packet is missing from the sequence, the logic configured to initiate at least one retransmission of the missing data packet via a first transport protocol, the logic further configured to initiate another retransmission of the missing data packet via a second transport protocol in response to a determination that an attempt to access the missing data packet is imminent.

10. The apparatus of claim 9, further comprising a queue, wherein the logic is configured to store, in the queue, entries pointing to the data packets, one of the entries corresponding to the missing data packet, wherein the determination is based on whether an attempt to pull the corresponding entry, from the queue, is imminent.

11. The apparatus of claim 10, wherein the logic is configured to determine a value indicative of a number of entries to be pulled from the queue prior to the corresponding entry, wherein the logic is further configured to perform a comparison of the value to a threshold, and wherein the determination is based on the comparison.

12. The apparatus of claim 10, wherein the logic is configured to adjust the threshold based on whether the attempt to pull the corresponding entry is performed before the logic detects the missing data packet.

13. The apparatus of claim 10, wherein the logic is configured to determine a value indicative of a number of entries to be pulled from the queue prior to the corresponding entry, the logic further configured to determine whether to initiate the one retransmission based on a comparison of the value to a threshold.

14. The apparatus of claim 9, wherein the logic is configured to adjust a threshold based on whether the logic detects an original transmission of the missing data packet.

15. An apparatus for receiving data from networks, comprising:
    means for receiving a sequence of data packets from a network;
    means for detecting when a data packet is missing from the sequence; and
    means for initiating at least one retransmission of the missing data packet via a first transport protocol and for initiating another retransmission of the missing data packet via a second transport protocol in response to a determination that an attempt to access the missing data packet is imminent.

16. The apparatus of claim 15, further comprising a means for queuing and a means for storing, to the queuing means, entries pointing to the data packets, wherein the initiating means is configured to determine a value indicative of a number of the entries to be pulled from the queuing means prior to the missing data packet, wherein the determination is based on the value.

17. A computer-readable medium having a program, the program comprising:
    logic for receiving a sequence of data packets from a network; and
    logic for storing, in a queue, entries pointing to the data packets;
    logic for detecting when a data packet is missing from the sequence, the missing data packet having a queue position within the queue; and
    logic for selecting a transport protocol based on the queue position of the missing data packet and for initiating a retransmission of the missing data packet via the selected transport protocol.

18. A method for receiving data from networks, comprising:
    receiving a sequence of data packets;
    storing, to the queue, entries pointing to the data packets;

detecting when a data packet is missing from the sequence;

associating the missing data packet with a queue position within the queue;

selecting a transport protocol based on the associated queue position; and initiating a retransmission of the missing data packet via the selected transport protocol.

19. The method of claim 18, wherein the queue position is indicative of when an attempt to pull, from the queue, an entry pointing to the missing data packet is to occur.

20. The method of claim 18, further comprising comparing, to a threshold, a value indicative of the queue position, wherein the selecting is based on the comparing.

21. The method of claim 18, further comprising:
determining whether an attempt to pull, from the queue, an entry that corresponds to the missing data packet occurs prior to a detection of the missing data packet; and adjusting a threshold based on the determining.

22. The method of claim 18, further comprising:
comparing, to a threshold, a value indicative of the queue position; and initiating retransmission of the missing data packet via a different protocol based on the comparing.

23. A method for receiving data from networks, comprising:

receiving a sequence of data packets from a network;

detecting when a data packet is missing from the sequence;

initiating at least one retransmission of the missing data packet via a first transport protocol;

determining when an attempt to access the missing data packet is imminent; and initiating another retransmission of the missing data packet via a second transport protocol in response to the determining.

24. The method of claim 23, further comprising adjusting a threshold based on whether an original transmission of the missing data packet is received by a network interface.

25. The method of claim 23, further comprising adjusting a threshold based on whether the attempt to access occurs before the missing data packet is received by a network interface.

26. The method of claim 23, further comprising storing, to a queue, entries that point to the data packets, one of the entries corresponding to the missing data packet, wherein the determining is based on whether an attempt to pull the corresponding entry, from the queue, is imminent.

27. The method of claim 26, further comprising:
determining a value indicative of a number of entries to be pulled from the queue prior to corresponding entry; and comparing the value to a threshold, wherein the determining is based on the comparing.

28. The method of claim 26, further comprising:
determining a value indicative of a number of data packets to be pulled from the queue prior to the corresponding entry;

comparing the value to a threshold; and initiating the one retransmission based on the comparing.

* * * * *